US008360453B2

(12) United States Patent
Fruhmann et al.

(10) Patent No.: US 8,360,453 B2
(45) Date of Patent: Jan. 29, 2013

(54) BEARING MECHANISM FOR A TRANSVERSE LEAF SPRING

(75) Inventors: Gabriele Fruhmann, Bregenz (AT); Hartmut Werries, Bissendorf (DE); Peter Hofmann, Gauting (DE); Christoph Elbers, Stemwede (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/392,182

(22) PCT Filed: Aug. 11, 2010

(86) PCT No.: PCT/EP2010/061673
§ 371 (c)(1),
(2), (4) Date: Feb. 24, 2012

(87) PCT Pub. No.: WO2011/023545
PCT Pub. Date: Mar. 3, 2011

(65) Prior Publication Data
US 2012/0146309 A1 Jun. 14, 2012

(30) Foreign Application Priority Data
Aug. 26, 2009 (DE) .......................... 10 2009 028 900

(51) Int. Cl.
*B60G 11/10* (2006.01)
(52) U.S. Cl. ..................................... 280/124.175; 267/7
(58) Field of Classification Search ............. 280/124.17, 280/124.171, 124.175, 680, 686; 267/3, 267/6, 7, 30, 140.4, 141.1–141.5
See application file for complete search history.

(56) References Cited

U.S. PATENT DOCUMENTS

| 2,697,613 | A | * | 12/1954 | Giacosa ................... 280/124.14 |
|---|---|---|---|---|
| 3,181,641 | A | | 5/1965 | Haddad |
| 3,377,060 | A | | 4/1968 | Sherwood |
| 4,630,804 | A | | 12/1986 | Fesko |
| 4,643,406 | A | | 2/1987 | Mounier-Poulat et al. |
| 4,684,110 | A | | 8/1987 | Sale et al. |
| 5,826,896 | A | | 10/1998 | Baumann |
| 6,220,580 | B1 | | 4/2001 | Balczun |
| 2012/0146308 | A1 | * | 6/2012 | Fruhmann et al. ..... 280/124.175 |
| 2012/0146309 | A1 | * | 6/2012 | Fruhmann et al. ..... 280/124.175 |
| 2012/0146310 | A1 | * | 6/2012 | Fruhmann et al. ..... 280/124.175 |
| 2012/0153593 | A1 | * | 6/2012 | Fruhmann et al. ..... 280/124.175 |
| 2012/0153594 | A1 | * | 6/2012 | Heimann et al. ....... 280/124.175 |

FOREIGN PATENT DOCUMENTS

| DE | 4239512 A1 | 5/1994 |
|---|---|---|
| DE | 19533803 A1 | 3/1997 |
| DE | 102 28 902 A1 | 2/2004 |

(Continued)

*Primary Examiner* — Drew Brown
(74) *Attorney, Agent, or Firm* — Davis & Bujold, PLLC

(57) ABSTRACT

A bearing mechanism for a transverse leaf spring mounted near a vehicle axle of a vehicle. The bearing mechanism has an outer bearing shell device and insertion devices, which are encompassed by the outer bearing shell device and comprise layer elements of different stiffness. The insertion devices are each disposed between the outer bearing shell device and the transverse leaf spring. First layer elements have a greater stiffness and are positioned between the transverse leaf spring and second layer elements with lower stiffness. The first layer elements are half-shell shaped and convex between end regions and oriented in the axial direction of the transverse leaf spring. The end regions of the first layer elements comprise regions that are concave with respect to the surface of the leaf spring, and free ends of which point away from the surface of the leaf spring.

16 Claims, 21 Drawing Sheets

FOREIGN PATENT DOCUMENTS

| | | |
|---|---|---|
| EP | 0 373 389 A2 | 6/1990 |
| EP | 0 763 438 A2 | 3/1997 |
| EP | 0993971 A2 | 4/2000 |
| EP | 1 645 445 A1 | 4/2006 |
| FR | 2543073 A1 | 9/1984 |
| JP | 4059406 A | 2/1992 |
| JP | 4 297313 A | 10/1992 |
| JP | 7 039242 B | 5/1995 |
| WO | 2008/125076 A1 | 10/2008 |

\* cited by examiner

BEARING MECHANISM FOR A TRANSVERSE LEAF SPRING

This application is a national stage completion of PCT/EP2010/061673 filed Aug. 11, 2010 which claims priority from German Application Serial No. 10 2009 028 900.3 filed Aug. 26, 2012.

FIELD OF THE INVENTION

The invention relates to a bearing mechanism for a transverse leaf spring.

BACKGROUND OF THE INVENTION

Document JP 04-059 406 A makes known a bearing mechanism for a transverse leaf spring that can be mounted in the region of a vehicle axle of a vehicle, comprising an outer bearing shell device and insertion devices, at least some regions of which are encompassed by the outer bearing shell device. The insertion devices each comprise layer elements having different stiffness, wherein, in the assembled state, the insertion devices are each disposed between the outer bearing shell device and the transverse leaf spring. Layer elements or metal elements formed with greater stiffness are positioned between the transverse leaf spring and layer elements formed with lower stiffness, which are made of vulcanized rubber. The layer elements formed with greater stiffness are half-shell shaped and convex between end regions oriented in the axial direction of the transverse leaf spring. The end regions of the layer elements formed with greater stiffness comprise regions that are curved at least approximately concavely with respect to the surface of the transverse leaf spring, the free ends of which point away from the surface of the transverse leaf spring.

It is disadvantageous, however, that the resilient layer elements formed with lower stiffness in the assembled state of the bearing mechanism deforms under the pretensioning force applied by the outer bearing shell device between the outer bearing shell device and the transverse leaf spring and is squeezed therebetween in an undefined manner, and therefore the functionality of the bearing mechanism cannot be ensured to a desired extent. Moreover, assembly of the bearing mechanism is complex and positioning of the various layer elements with respect to one another is not ensured to the necessary extent due to the design of the layer elements of the insertion devices.

SUMMARY OF THE INVENTION

The problem addressed by the present invention is therefore that of providing an easily assembled bearing mechanism, the operation of which is ensured when a bearing pretensioning force is applied.

The bearing mechanism according to the invention for a transverse leaf spring that can be mounted in the region of a vehicle axle of a vehicle is equipped with an outer bearing shell device and insertion devices, at least some regions of which are encompassed by the outer bearing shell device. The insertion devices each have layer elements having different stiffness. In addition, in the assembled state, the insertion devices are each disposed between the outer bearing shell device and the transverse leaf spring. Layer elements of the insertion devices formed with greater stiffness are positioned between the transverse leaf spring and layer elements formed with lower stiffness. The layer elements formed with greater stiffness are half-shell shaped and convex between end regions oriented in the axial direction of the transverse leaf spring, and the end regions of layer elements formed with greater stiffness comprise regions that are curved at least approximately concavely with respect to the surface of the transverse leaf spring, the free ends of which point away from the surface of the transverse leaf spring.

According to the invention, the layer elements formed with greater stiffness adjoining the layer elements formed with lower stiffness and the transverse leaf spring encompass, by way of the ends thereof, the layer elements formed with lower stiffness in a form-locking manner in sections, thereby centering the layer elements formed with greater stiffness on the layer elements formed with lower stiffness and permitting easy assembly, and thereby preventing an undefined squeezing of the layer elements formed with lower stiffness due to the pretensioning force applied by the outer bearing shell device and the transverse leaf spring on these layer elements out of the region between the outer bearing shell device and the transverse leaf spring in a manner having a simple design, and ensuring trouble-free operation of the bearing mechanism.

The end regions of the layer elements formed with greater stiffness, which are curved upward with respect to the surface of the transverse leaf spring, easily prevent damage to the transverse leaf spring, due to the rounded shape thereof, even when the transverse leaf spring undergoes greater deformations or greater deflections.

In addition, rotational movement of the transverse leaf spring in the region of the bearing mechanism required for operating the transverse leaf spring with simultaneously sufficiently high bearing rigidity is possible due to the layer elements of the insertion devices being designed with different stiffnesses, whereby different spring rates can be adjusted for the unidirectional and alternating deflections in the region of the wheels of the two sides of the vehicle.

In addition, wheel suspension functions can also be adjusted using the transverse leaf spring due to the different stiffnesses of the layer elements, because bearing stiffness in the transverse direction of the vehicle for example can be set appropriately high, and shifting of the transverse leaf spring in the transverse direction of the vehicle can be avoided in a simple manner.

Additionally, bearing stiffness of the bearing mechanism according to the invention can be sufficiently adjusted also in the vertical direction of the vehicle by means of a sufficient frictional connection between the bearing mechanism and the transverse leaf spring. In this simple manner, it is possible during alternating deflections to avoid undesired shifting corresponding to a rigid body, or movement of the transverse leaf spring in the region of the bearing mechanism. With appropriately high bearing stiffness of the bearing mechanism according to the invention in the vertical direction of the vehicle, a targeted deformation of the transverse leaf spring is attained in the shape of a so-called S-stroke, resulting in a higher alternating spring rate in the region of the transverse leaf spring compared to simultaneous deflections without an appropriate S-stroke.

In an advantageous development of the bearing mechanism according to the invention, further layer elements having greater stiffness are provided between the layer elements formed with lower stiffness and the outer bearing shell device, in order to design the bearing mechanism having a bearing stiffness that is adapted to the particular application.

In an embodiment of the bearing mechanism according to the invention that is also easily assembled, the further layer elements having greater stiffness, which adjoin the layer elements formed with lower stiffness and the outer bearing shell device, encompass the outer bearing shell device by way of the free ends thereof.

In an advantageous embodiment of the bearing mechanism according to the invention, the outer bearing shell device comprises two outer bearing shells that can be connected together, which encompass the insertion devices at least in sections, wherein, in a further development of the bearing mechanism according to the invention, the insertion devices can be connected to the outer bearing shells and the transverse leaf spring via a bolt device connecting the outer bearing shells together and to a vehicle chassis at least in a force locking manner.

The latter embodiment of the bearing mechanism according to the invention is more favorable in terms of construction space compared to bearing mechanisms known from the prior art since the bearing mechanism can be assembled on the transverse leaf spring merely in the region of the outer bearing shells using a bolt device that in turn solidly connects the bearing mechanism to the vehicle chassis or to an auxiliary frame connected thereto. In the assembled state of the bearing mechanism, pretensioning force is applied to the insertion devices via the bolt device.

As there are no additional bolt devices in the region of the insertion devices, then, compared to the solutions known from the prior art, the layer elements can be designed with small dimensions and also produced cost-effectively because no threads need to be cut into the layer element, for example.

In order to be able to transfer forces and torques acting during operation of a vehicle from the layer elements formed with lower stiffness with the lowest possible surface pressure into the region between the insertion devices and transverse leaf spring, the transverse leaf spring can be formed having convex elevations in contact regions disposed on the top side and the bottom side with respect to a vertical axis of the vehicle, or an insertion part of the insertion devices that is preferably at least nearly semi-cylindrical can be disposed in each case between the layer elements of the insertion devices and the transverse leaf spring; the insertion parts being designed with greater stiffness than the layer elements designed with lower stiffness.

The term insertion parts designed at least nearly semi-cylindrically includes all volumetric shapes which are designed at least having at least nearly circular segment-like base surfaces offset to each other. The possibility exists that the curve of the base connecting the chord ends is designed having a circular or elliptical shape. In further developments, the chord is formed straight or possibly curved, preferably convex. Depending on the respective application case, the region of the transitions between the chord and the curve of the base can have edges or corresponding roundings.

In order to avoid damaging the transverse leaf spring in the region of the bearing mechanism during operation of the vehicle, the insertion parts of the insertion devices can be formed having a resilient protective coating at least in contact regions facing the transverse leaf spring in the assembled state. In a further advantageous embodiment of the bearing mechanism according to the invention, alternatively or in addition thereto, the layer elements formed with greater stiffness are provided with a resilient protective coating in the end regions, at least in sections.

The bearing stiffness of the bearing mechanism according to the invention can be varied in that at least the layer elements formed with lower stiffness comprise recesses.

To enable acting forces and torques to be introduced from insertion devices into the transverse leaf spring without relative movement between the insertion devices and the transverse leaf spring during operation of a vehicle, in a further advantageous embodiment of the bearing mechanism according to the invention, at least one of the insertion devices in a contact surface facing a support surface is designed having at least one receiving device into which a region of the transverse leaf spring engages in the assembled state of the insertion devices. The bearing mechanism according to the invention is therefore connected to the transverse leaf spring via the frictional connection produced by the bolt device and in a form-locking manner, wherein the form-locking between the bearing mechanism and the transverse leaf spring is preferably designed such that the lowest possible additional stresses arise in the transverse leaf spring due to the form locking; such forces possibly impact the function of the transverse leaf spring to an undesired extent and reduce a service life of the transverse leaf spring.

Additionally or alternatively thereto, in further advantageous embodiments of the bearing mechanism according to the invention, a form-locking can be produced between the bearing mechanism and the transverse leaf spring in that, in the region of one of the support surfaces of the transverse leaf spring a recess is formed for each of the insertion devices, and at least sections of the insertion devices engage therein in a form-locking manner.

Preferably, the region of the transverse leaf spring engaging into the insertion devices is in the region of the recess of the transverse leaf spring, whereby progression of fibers of a transverse leaf spring preferably produced from a composite material deviate only minimally in the region of the bearing mechanism from the progression necessary for the operation of the transverse leaf spring.

The layer elements of the insertion devices formed with the lower stiffness and having bulge-like end regions preferably pointing in the transverse vehicle direction in the assembled state, each encompass the outer bearing shells in an advantageous embodiment of the mechanism according to the invention, wherein the outer bearing shells preferably engage into the bulge-like end regions of the layer elements with projections. As a result, the insertion devices can be appropriately positioned in the transverse vehicle direction with respect to the outer bearing shells, whilst the positioning between the insertion devices and the outer bearing shells in the longitudinal vehicle direction is guaranteed using projections of the outer bearing shells engaging into the layer elements or the bulge-like end regions thereof, and therefore it is possible to easily assemble the bearing mechanism.

In a further advantageous embodiment of the bearing mechanism according to the invention, the layer elements formed with the lower stiffness overlap the transverse leaf spring with stop regions in the assembled state in the longitudinal direction of the vehicle and in the vertical direction of the vehicle at least in sections, in order to be able to position the multi-part insertion devices during assembly in a simple manner with respect to the transverse leaf spring, and to be able to supply a soft support of the transverse leaf spring in the longitudinal direction of the vehicle in the region of the outer bearing shells in a constructively simple manner.

The stop regions can be designed in the contact regions facing the transverse leaf spring and/or in the contact regions facing the outer bearing shells, with projections and/or recesses oriented at least nearly in the longitudinal direction of the vehicle, in order to attain different bearing stiffnesses via the shift of the transverse leaf spring in the region of the bearing mechanism according to the invention, where the stop regions acting as a bearing stops can be designed differently ahead of and behind the transverse leaf spring in the longitudinal direction of the vehicle with respect to a front of the vehicle, in order to be able to represent correspondingly different bearing characteristics.

Further advantages and advantageous embodiments of the subject matter according to the invention arise from the patent claims and the example embodiments described in the following based on the drawings, where for the sake of clarity, in the description of the different example embodiments components that are the same or functionally equivalent are provided with the same reference numbers.

Features specified in the dependent claims as well as the features specified in the following example embodiments of the bearing mechanism according to the invention are suitable, alone or in any arbitrary combination of the subject matter according to the invention, to be further developed. The respective combinations of features with respect to the further development of the subject matter according to the invention do not represent limitations, but rather merely comprise examples.

BRIEF DESCRIPTION OF THE DRAWINGS

They show.

DETAILED DESCRIPTION OF THE INVENTION

Figure 1:
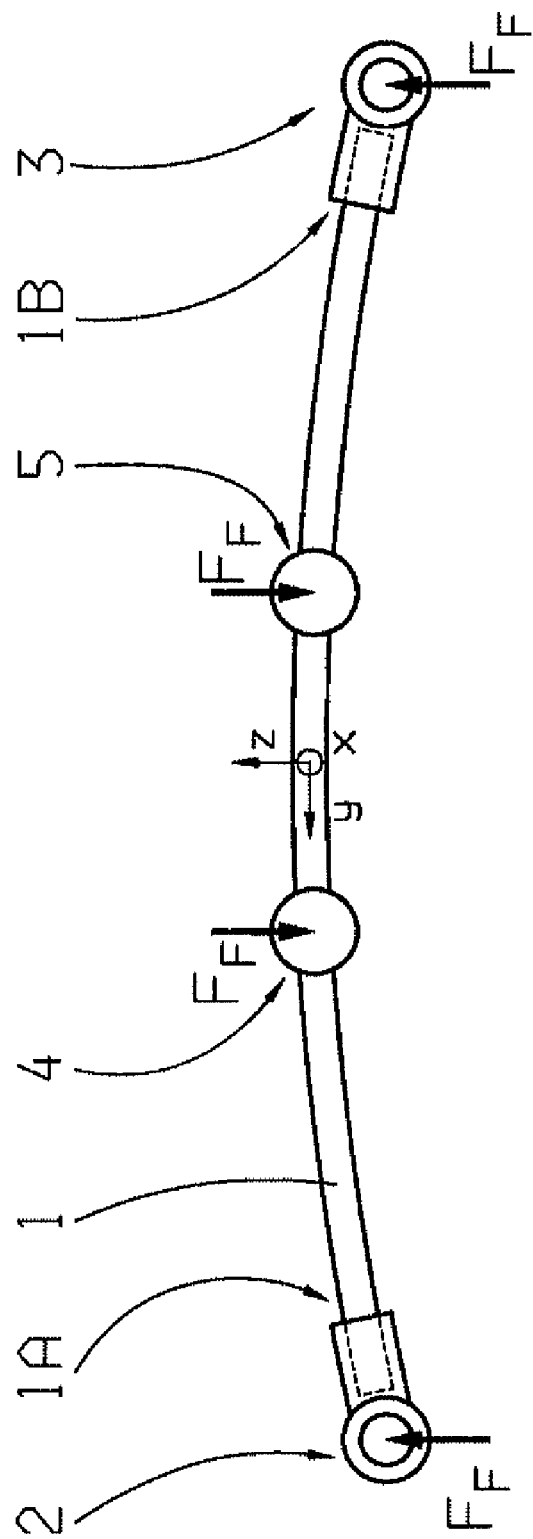
FIG. 1 a highly schematic representation of a transverse leaf spring having two outer guide bearings and two bearing mechanisms according to the invention, disposed in the center region of the transverse leaf spring.

FIG. 1 shows a highly schematic representation of a transverse leaf spring 1 that can be mounted in the region of a vehicle axle of a vehicle. The transverse leaf spring 1 is supported at the end regions 1A, 1B thereof facing toward wheels of the vehicle axle, in outer bearings 2, 3 or guide bearings, designed here as so-called bearing shoes, and connected to wheel carriers of the vehicle axle.

The transverse leaf spring 1 in the center region thereof is effectively connected, directly to a vehicle chassis or to an auxiliary frame connected in turn the vehicle chassis and supported thereon via bearing devices 4, 5 acting as a central bearing. The bearing mechanisms 4 and 5 are disposed symmetrically about the center of the transverse leaf spring 1 and connect the mechanisms to the vehicle chassis in a manner described below, where rotations of the transverse leaf spring 1 in the region of the bearing mechanisms 4 and 5 are possible to the required extent during unidirectional and alternating spring actions such that different spring rates can be adjusted using the transverse leaf spring 1 with unidirectional and alternating deflections in the regions 1A and 1B.

The bearing mechanisms 4 and 5 have high bearing stiffness in the transverse direction of the vehicle, or respectively the y-direction, and during operation of a vehicle constructed with the transverse leaf spring 1 and the bearing mechanisms 4 and 5, deform only marginally in the y-direction, in order to take on wheel guiding tasks along with the described suspension function. The high bearing stiffness in the y-direction offers the additional possibility to avoid an overall shift of the transverse leaf spring 1 in the transverse direction of the vehicle, or respectively the y-direction, in a simple manner.

In order to create the frictional connection between the bearing mechanisms 4 and 5 and transverse leaf spring 1 necessary for the trouble-free function of the transverse leaf spring 1, the two bearing mechanisms 4 and 5 are also designed with a correspondingly high bearing stiffness in the vertical direction of the vehicle, or z-direction. Furthermore, due to the high bearing stiffness of the bearing mechanisms 4 and 5 in the vertical direction of the vehicle, the transverse leaf spring 1 does not have the shift of a rigid body in the region of the bearing mechanisms 4 and 5 during alternating deflection of the end regions 1A and 1B. During alternating deflection, the transverse leaf spring 1 is accordingly deformed in a targeted manner in a so-called S-stroke, and provides a higher alternating spring rate.

Figure 2:
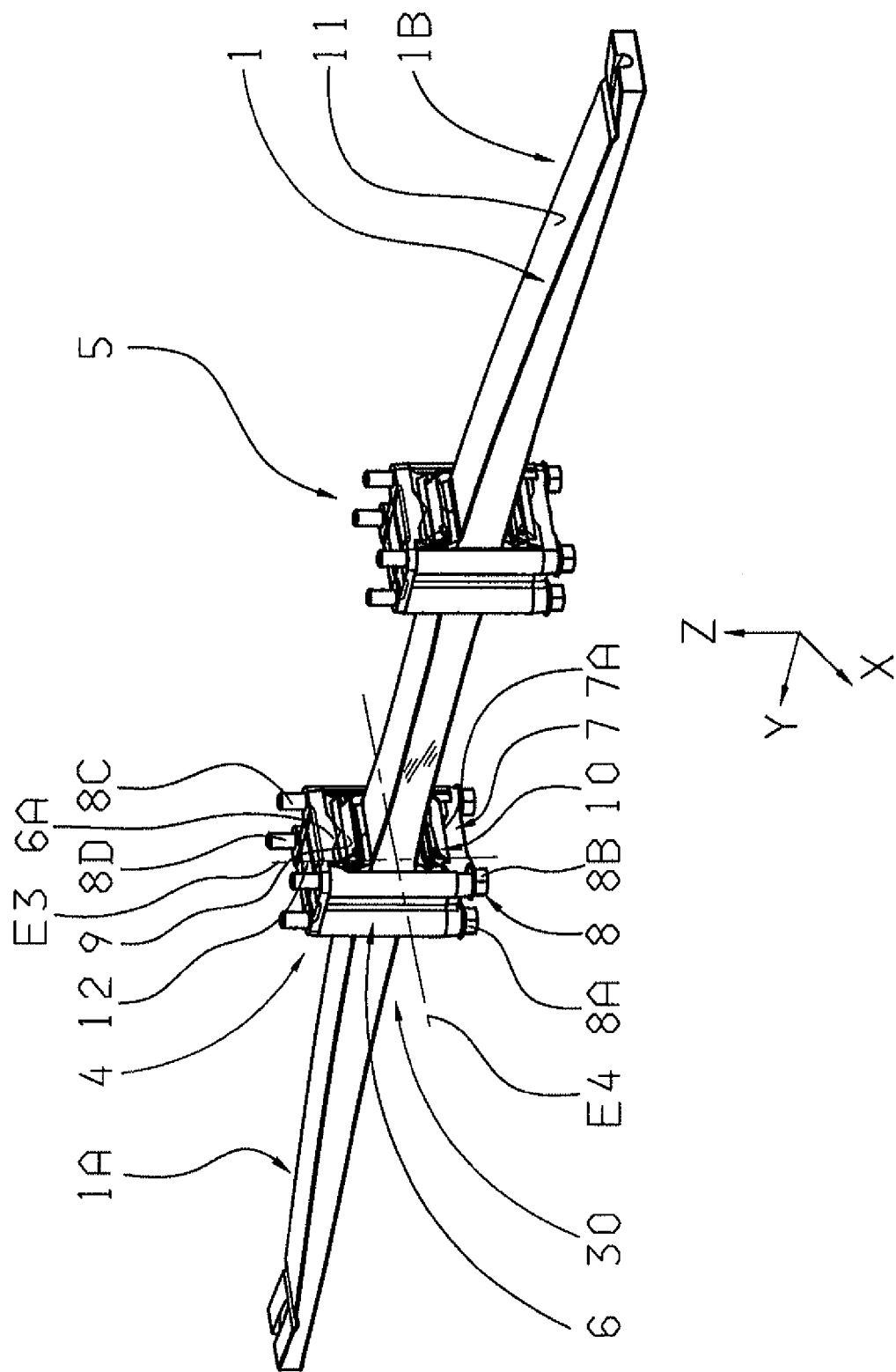
FIG. 2 a three-dimensional representation of a first embodiment of the bearing mechanism according to the invention that is disposed in a center region of a transverse leaf spring.

FIG. 2 shows a three-dimensional representation of the transverse leaf spring 1 designed as a beam-like spring element. The transverse leaf spring 1 is connected to and supported at a vehicle chassis, not shown in more detail, by the two bearing mechanisms 4, 5, and connected via the two end region bearing devices 2, 3 to the wheels of a vehicle axle of the vehicle, and supported in the end regions 1A, 1B. The so-called four point bearing allows both vertical suspension and roll suspension in the region of the transverse leaf spring 1, whereby conventional suspension springs and stabilizers known from the prior art are omitted. Along with the cited suspension functions, wheel guiding functions can also be provided by the transverse leaf spring 1 in a corresponding embodiment of the bearing mechanisms 4 and 5, and the end region bearings 2 and 3. Along with great cost savings potential, the present spring system also provides the possibility for weight reduction in the region of the vehicle axle due to appropriate selection of the material for producing the transverse leaf spring 1, for example fiber composite material.

Figure 3:
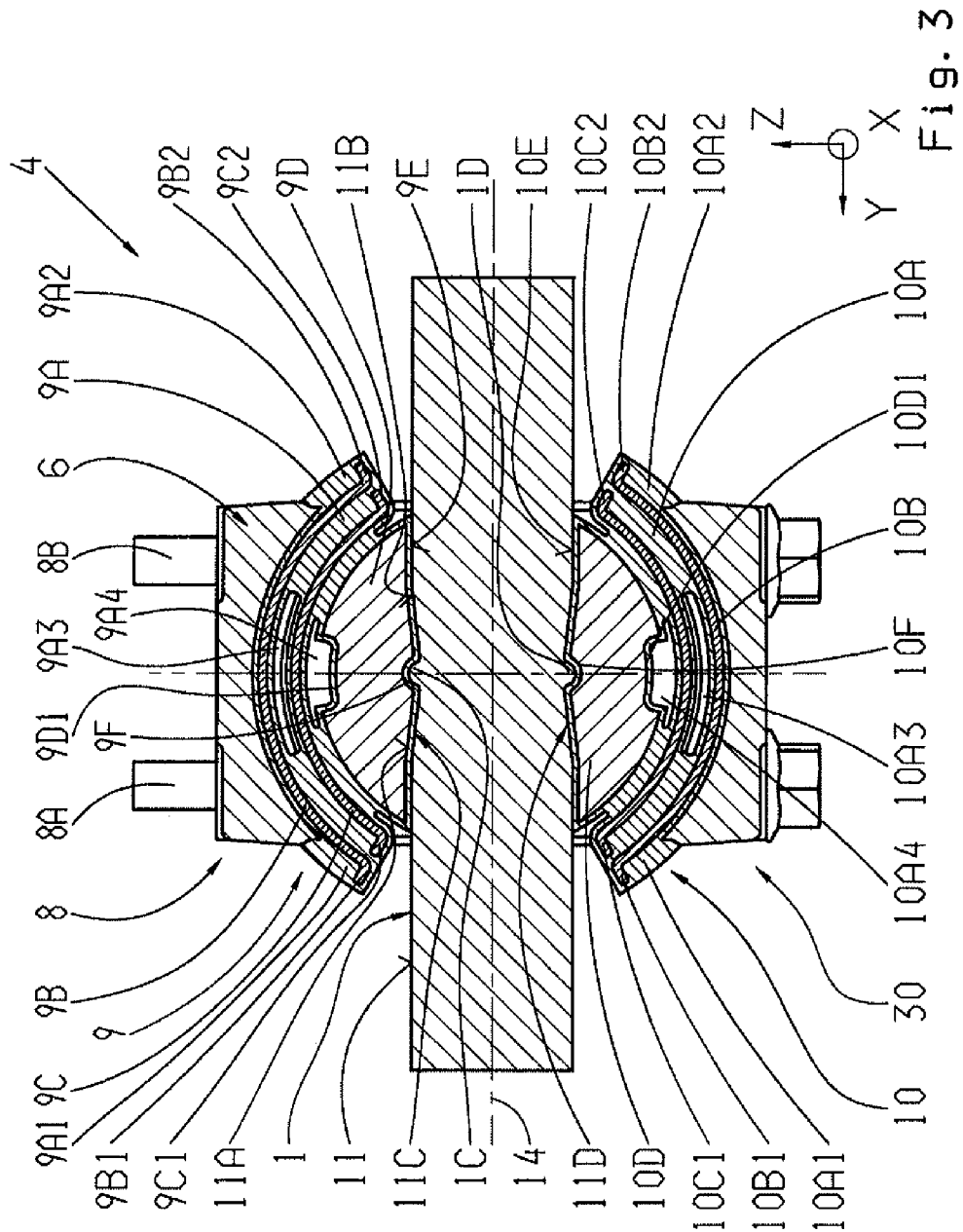
FIG. 3 the bearing mechanism according to FIG. 2 in a longitudinal sectional view along a longitudinal sectional plane E3 shown in more detail in FIG. 2.
Figure 4:
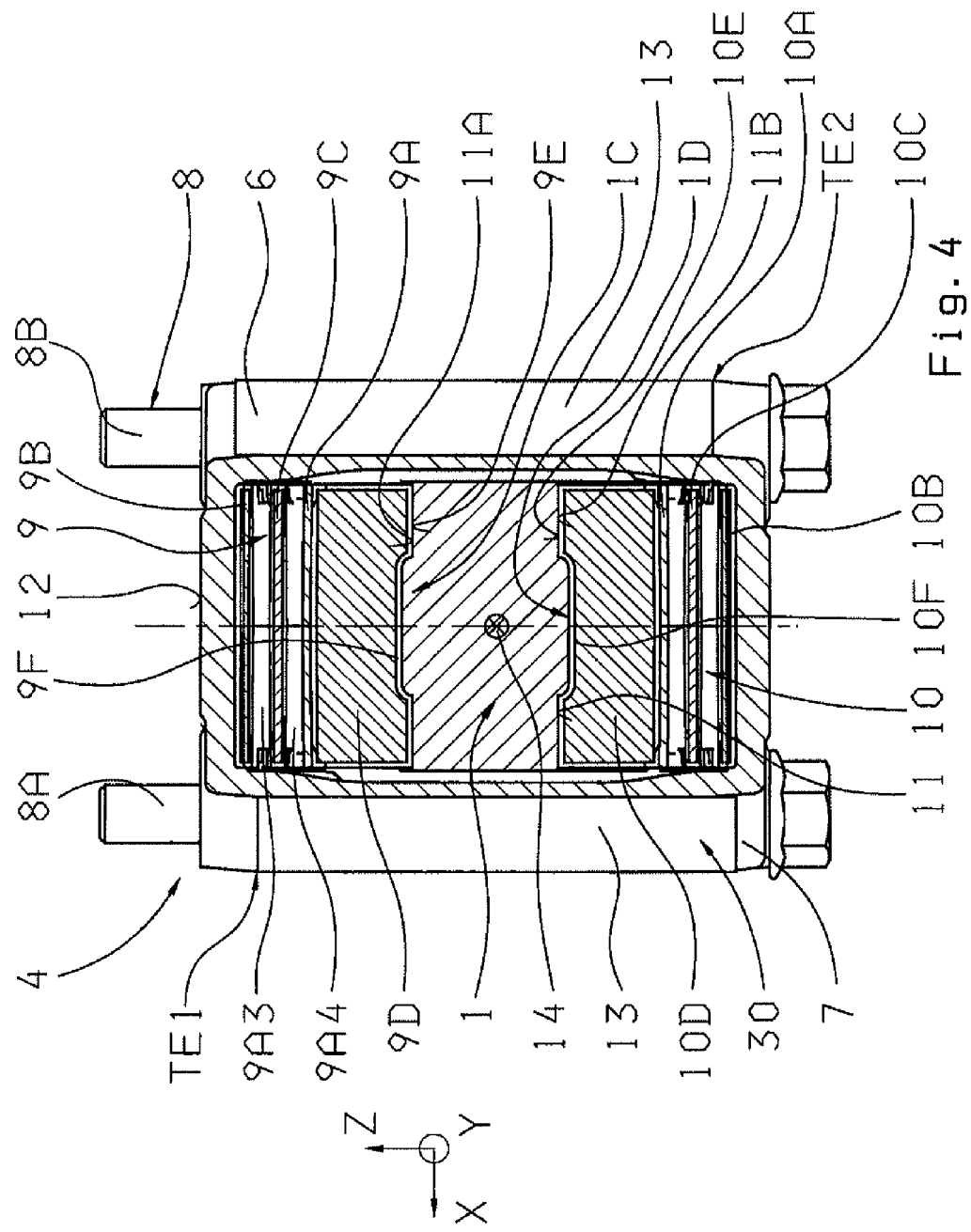
FIG. 4 the bearing mechanism according to FIG. 2 in a sectional view along the transverse sectional plane E4 shown in more detail in FIG. 2.
Figure 5:
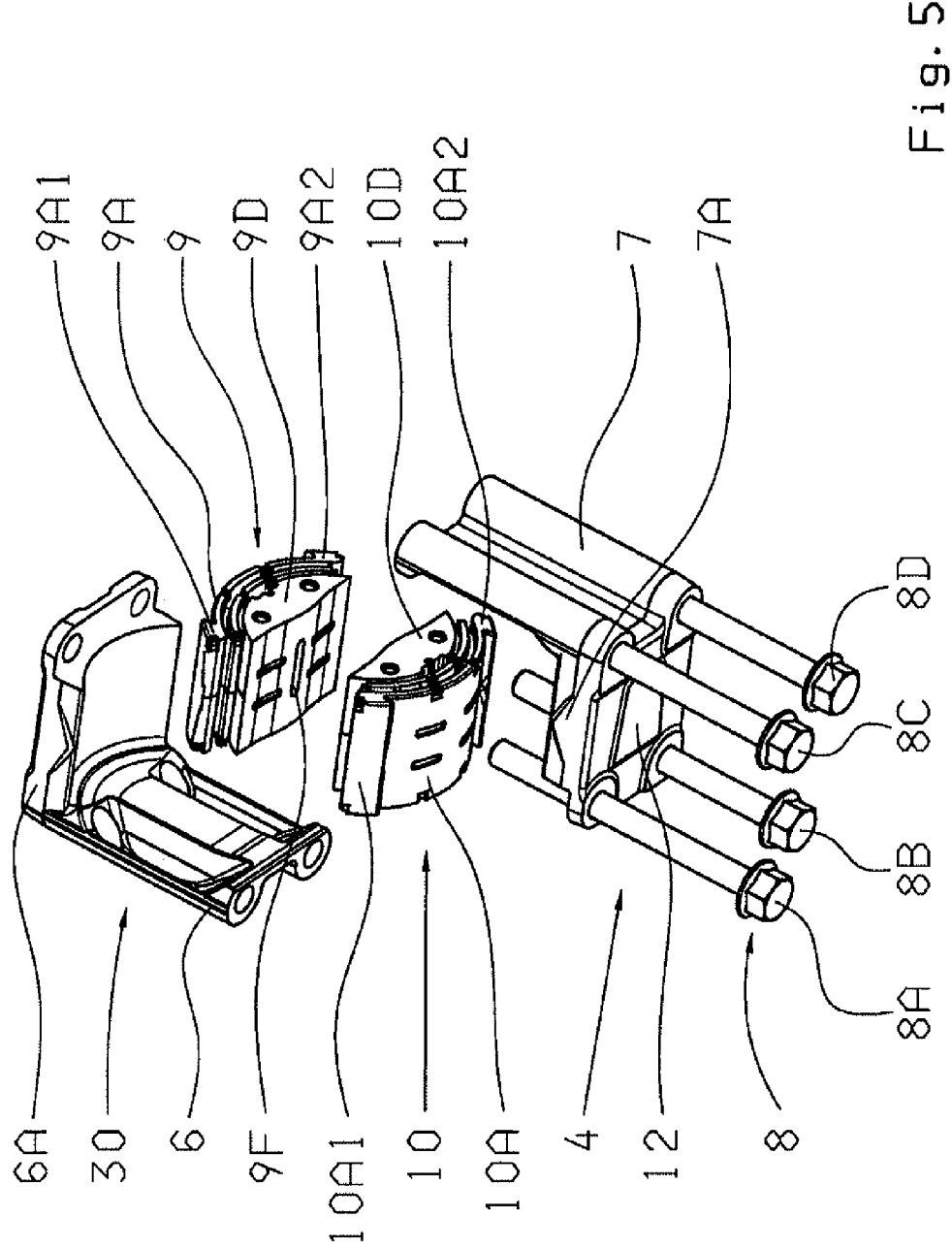
FIG. 5 the bearing mechanism according to FIG. 2 in a three-dimensional individual view in an exploded representation.

FIG. 3 shows a longitudinal view of a sectional plane E3, graphically depicted in greater detail in FIG. 2 only by a dash-dotted line, which corresponds to a so-called yz-sectional plane. FIG. 4 shows a cross-sectional view of the bearing mechanism 4 along a cross-sectional plane E4, likewise depicted as a dash-dotted line in FIG. 2, where the cross-sectional plane E4 corresponds substantially to a so-called xz-cross-sectional plane. FIG. 5 graphically portrays a three-dimensional exploded diagram of the bearing mechanism 4 in an individual view.

The bearing mechanisms 4 and 5 fundamentally comprise the same construction, which is why the following description for FIG. 2 to FIG. 6 mainly describes only the bearing mechanism 4.

The bearing mechanism 4 comprises an outer shell bearing device 30 having two outer bearing shells 6, 7 that can be connected together, which are presently connected together via a bolt device 8 comprising four bolt elements 8A to 8D, where by means of the bolt device-side connection a pretensioning force necessary for producing the frictional connection between the bearing mechanism 4 and the transverse leaf spring 1 can be applied to insertion devices 9, 10 disposed between the outer bearing shells 6 and 7. The bearing mechanism 4 can also be connected to the vehicle chassis, or the auxiliary frame, via the bolt device 8.

The outer bearing shells 6 and 7 are presently formed angled or L-shaped, and adjoin each other in the region of two separation planes TE1 and TE2. Additionally, the outer bearing shells 6 and 7, in the regions thereof overlapping the transverse leaf spring 1 in the vertical direction of the vehicle, are each formed with a web 13, by means of which movement of the insertion devices 9 and 10 is limited in the longitudinal direction of the vehicle, or in the x-direction.

Moreover, the outer bearing shells 6 and 7 can be designed to simplify assembly with centering devices that comprise alignment pins fitted into corresponding bore holes of the outer bearing shells 6 and 7, wherein the outer bearing shells 6 and 7 are centered to each other using tongue and groove implementations or the like depending on the application case and the discretion of the person skilled in the art.

Both the outer bearing shells 6 and 7 and the insertion devices 9 and 10 are formed identically, in order to keep the production costs of the bearing mechanism 4 as low as possible. The insertion devices 9 and 10 are formed here having three layer elements 9A to 9C, or 10A to 10C, and each having an insertion part 9D or 10D that is formed substantially semi-cylindrically. Here, the layer elements 9A and 10A of the insertion devices 9 and 10 are produced from a resilient material, which is applied during a vulcanization onto the metal layer elements 96, 9C or 10B, 10C, and onto the insertion parts 9D and 10D that are presently similarly produced from metal, or which encompasses the layer elements 9B, 9C or 10B, 10C as well as the insertion parts 9D or 10D.

The insertion parts 9D and 10D can also be produced from plastic, fiber composite materials, natural materials, such as wood, stone and the like, as well as from different metal materials.

The layer elements 9B, 9C or 10B, 10C are designed with greater stiffness than the layer elements 9A or 10A, and between end regions 9B1, 9B2, 9C1, 9C2 or 10B1, 10B2, 10C1, 10C2 oriented in the axial direction of the transverse leaf spring 1 comprise regions formed substantially as convex, half-shell shaped hollow cylinders. The end regions 9B1, 9B2 or 1081, 10B2 of the layer elements 9C or 10B are connected to the convex regions with respect to the surface 11 via concave curved regions, and face away from the surface 11 of the transverse leaf spring 1, whereby damage to the layer element-side of the surface 11 during large deflections of the transverse leaf spring 1 is avoided in a constructively simple manner. Damage to the surface 11 of the transverse leaf spring 1 is additionally further reduced by the layer element-side or rubbery-like coating of the layer elements 9B, 9C or 10B, 10C and the insertion parts 9D or 10D.

The protective coating regions of the layer elements 9A or 10A between the insertion parts 9D or 10D and the contact surfaces 11A, 11B of the transverse leaf spring 1 sufficiently protect the surface 11 of the transverse leaf spring 1 against damage during oscillating loads which impact the service life of the transverse leaf spring to an undesired extent.

In addition, the protective coating can prevent fine dirt particles from penetrating between the insertion parts 9D and 10D and the transverse leaf spring 1. Here it is also conceivable that the insertion parts 9D and 10D are bonded to the surface 11 of the transverse leaf spring 1 for preventing the penetration of dirt particles, where this can be designed in the embodiment with or also without the protective coating.

Furthermore, the vulcanization coating of the insertion parts 9D and 10D can compensate for manufacturing tolerances in the region of the form-locking between the bearing mechanism 4 of the transverse leaf spring 1, and a coefficient of friction between the insertion parts 9D and 10D and the transverse leaf spring 1 can be increased by suitable material selection and corresponding surface characteristics of the protective coating.

The insertion devices 9 and 10 are connected to the outer bearing shells 6 or 7 in a form-locking manner via bulge-like end regions 9A1, 9A2, or 10A1, 10A2 of the layer elements 9A or 10A, whereby during assembly of the bearing mechanism 4 the insertion devices 9 and 10 are positioned in the y-direction with respect to the bearing shell 6 or the bearing shell 7. Additionally, the insertion devices 9 and 10 are positioned during assembly in the x-direction, or in the longitudinal direction of the vehicle, via centering regions 6A, 7A of the outer bearing shells 6 and 7, which in the assembled state of the bearing mechanism 4 engage in a form-locking manner into the bulge-like end regions 9A1, 9A2 or 10A1, 10A2 of the layer element 9A or 10A.

During assembly, the two outer bearing shells 6 and 7 are slipped onto the insertion devices 9 and 10 and are positioned in the outer bearing shells 6 and 7 through notches of the bulge-like end areas 9A1, 9A2 or 10A1, 10A2, into which the projections 6A, 7A of the outer bearing shells 6 and 7 engage.

The required bearing stiffnesses are adjusted via the integration of the metal layers, or layer elements 9B and 9C or 10B, 10C, in the resilient layer elements 9A and 10C. Additionally, there are cavities or recesses 9A3, 9A4 or 10A3, 10A4 in the regions of the layer elements 9A and 10A in order to adjust the bearing stiffness of the bearing mechanism 4 to the present requirements. The insertion parts 9D and 10D are each formed in regions with recesses 9D1 or 10D1 facing the layer elements 9C or 10C.

Furthermore, in the contact surfaces 9E and 10E that are facing the support surfaces 11A and 11B of the transverse leaf spring 1, the insertion devices 9 and 10 are formed each having at least one receiving device 9F or 10F, into which in the assembled state of the insertion devices 9 and 10 a region 1C or 10 of the transverse leaf spring 1 engages in a form-locking manner. Additionally, in the vertical direction of the vehicle, or z-direction, the transverse leaf spring 1 in the region of the support surfaces 11A and 11B, comprises recesses 11C, 11D each for the insertion devices 9 or 10, and into which the insertion devices 9 and 10 engage in a form-locking manner via correspondingly shaped insertion parts 9D and 10D, so that during operation of a vehicle relative movement of the transverse leaf spring 1 in the transverse direction of the vehicle, or in the y-direction with respect to the vehicle chassis, is avoided in a constructively simple manner and also via an additional form-locking between the transverse leaf spring 1 and the bearing mechanism 4 in addition due to the force locking connection to the bearing mechanism 4.

The recesses 11C and 11D, or the contours of the recesses 11C and 11D, are formed such that during operation stress is distributed as uniformly as possible in a contact region of the bearing mechanism 4 at the transverse leaf spring 1 which favorably influences the service life of the transverse leaf spring 1. The contour of the recesses 11C and 11D each substantially correspond to a special cosinusoidal indentation in the y-direction, thereby attaining a stress distribution that is as uniform as possible in the bearing region of the transverse leaf spring 1. The outer bearing shells 6 and 7 are each formed having contact surfaces 12 to the vehicle chassis or for the auxiliary frame operatively connected to the vehicle chassis, in order to guarantee a direct as possible force flow between the bearing mechanism 4 and the vehicle chassis. However, departing therefrom, it is possible to form the bearing shells 6 and 7 differently at least in sections, in order to adapt the bearing mechanism 4 to the available construction spaces or to implement so-called poka-yoke requirements that effectively prevent incorrect assembly of the bearing mechanism 4.

Additionally, the position of the bearing mechanism 4 at the transverse leaf spring 1, which is essential for the overall function of the system, is also defined using the form-locking between the transverse leaf spring 1 and to bearing mechanism 4.

The present transverse leaf spring 1 is formed having a variable cross-section. In order to keep the portion of fibers in the cross section of the transverse leaf spring 1 as constant as possible, there exists the possibility that in the assembly region of the bearing mechanisms 4 and 5 in the longitudinal direction of the vehicle, the transverse leaf spring 1 is designed with a slightly broader cross-section than in comparison to the remaining cross-section. Alternatively, it is possible that the transverse leaf spring 1 is formed with a constant cross-section over the entire length.

The transverse leaf spring 1, in the region of the surface 11 thereof, is designed at least in the contact region to the bearing mechanisms 4 and 5 having a special surface coating and/or surface treatment, in order to increase the hardness of the surface 11 of the transverse leaf spring 1 with respect to the remaining surface 11, and/or to increase the coefficient of friction for increasing the connection forces in the region of the form-locking between the transverse leaf spring 1 and the bearing mechanism 4 and 5. Additionally it is possible to use a special surface coating and/or surface treatment of the surface 11 of the transverse leaf spring 1 in order to facilitate or simplify the manufacturing process for producing the regions 1C and 1D of the transverse leaf spring 1, for instance the process of demolding the transverse leaf spring 1 from the tool.

For example, an adhesive layer, a varnish layer, a plastic material and a plastic layer implemented with nanoparticles, are conceivable as a surface coating. During a surface treatment, the surface 11 of the transverse leaf spring 1 is pretreated with a fluid increasing the adhesion property of the surface for example, and then particles increasing the hardness or the coefficient of friction are applied onto the surface of the transverse leaf spring in the cited region, for example by vapor deposition.

The bearing mechanism 4 is pretensioned by the four bolt elements 8A to 8D, where high bearing stiffnesses in both the z-direction and y-direction with simultaneously low torsion stiffness about the longitudinal axis of the vehicle can be made available by means of the form-locking and force locking connection between the bearing mechanism 4 and the transverse leaf spring 1. During the assembly of the bearing mechanism 4, the insertion devices 9 and 10 are placed onto the top side and bottom side of the transverse leaf spring 1, and centered on the transverse leaf spring 1 in the transverse direction of the vehicle, or in the y-direction, by the regions 1C and 1D of the transverse leaf spring 1 engaging into the insertion devices 9 and 10, whereby precise fixing of the bearing mechanism 4 on the transverse leaf spring 1 is guaranteed.

The center of rotation of the two insertion devices 9 and 10 in the assembled state of the bearing mechanism 4 and 5 lies substantially on the neutral fiber of the transverse leaf spring 1, whereby deformations in the region of the insertion devices 9 and 10 are advantageously of substantially uniform extent. The recesses 11C and 11D of the transverse leaf spring 1, which are preferably cosinusoidal the transverse direction of the vehicle, provide a form-locking connection of the bearing mechanism 4 to the transverse leaf spring 1, where the cosinusoidal form, or the cosinusoidal transition between the surface 11 of the transverse leaf spring 1 outside of the recesses 11C and 11D and the support surfaces 11A and 11B in the region of the recesses 11C and 11D guarantees a transition that is as smooth as possible in the progression of the individual fibers of the transverse leaf spring 1 produced from composite material. The smooth transition in the progression of fibers of the transverse leaf spring 1 prevents adverse influence to the service life of the transverse leaf spring 1 in a simple manner.

The outer bearing shells 6 and 7 in the example embodiment of the bearing mechanism 4 shown in FIG. 2 to FIG. 5 are designed as cast iron components that in the assembled state comprise two separation planes.

Figure 6:
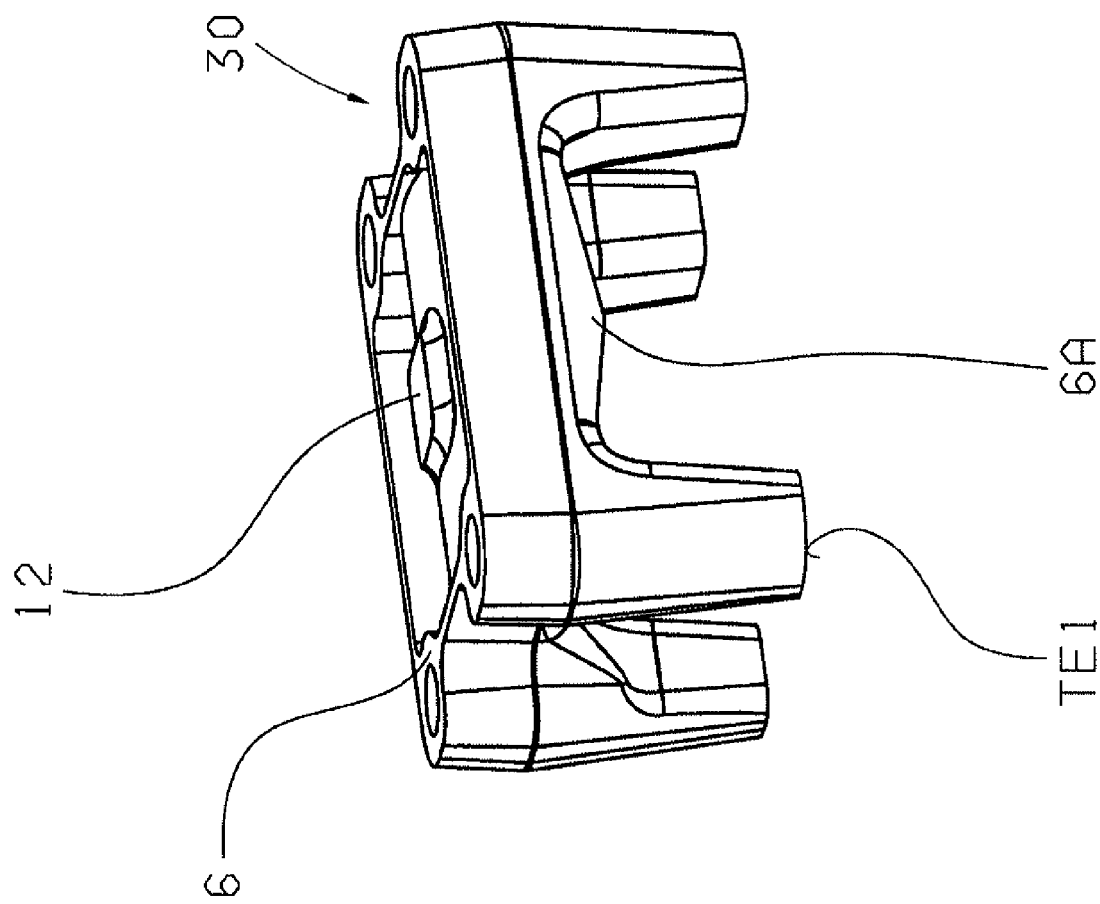
FIG. 6 an alternate embodiment of an outer bearing shell of the bearing mechanism according to FIG. 2.

In an alternative embodiment, the outer bearing shells 6 and 7 shown in FIG. 6 comprise a substantially U-shaped cross-section. The outer bearing shell 6 or 7 according to FIG. 6 is also designed as a cast iron component, and in the region of a separation plane abuts the respective other outer bearing shell 7 or 6. The upper and lower side of the outer bearing shells 6 and 7 can each be processed during a production step.

Depending on the respective application case, it is also possible that the outer bearing shells are produced from steel, aluminum or another suitable material. Furthermore, the outer bearing shells can also be implemented as a cold extrusion part.

Figure 7:
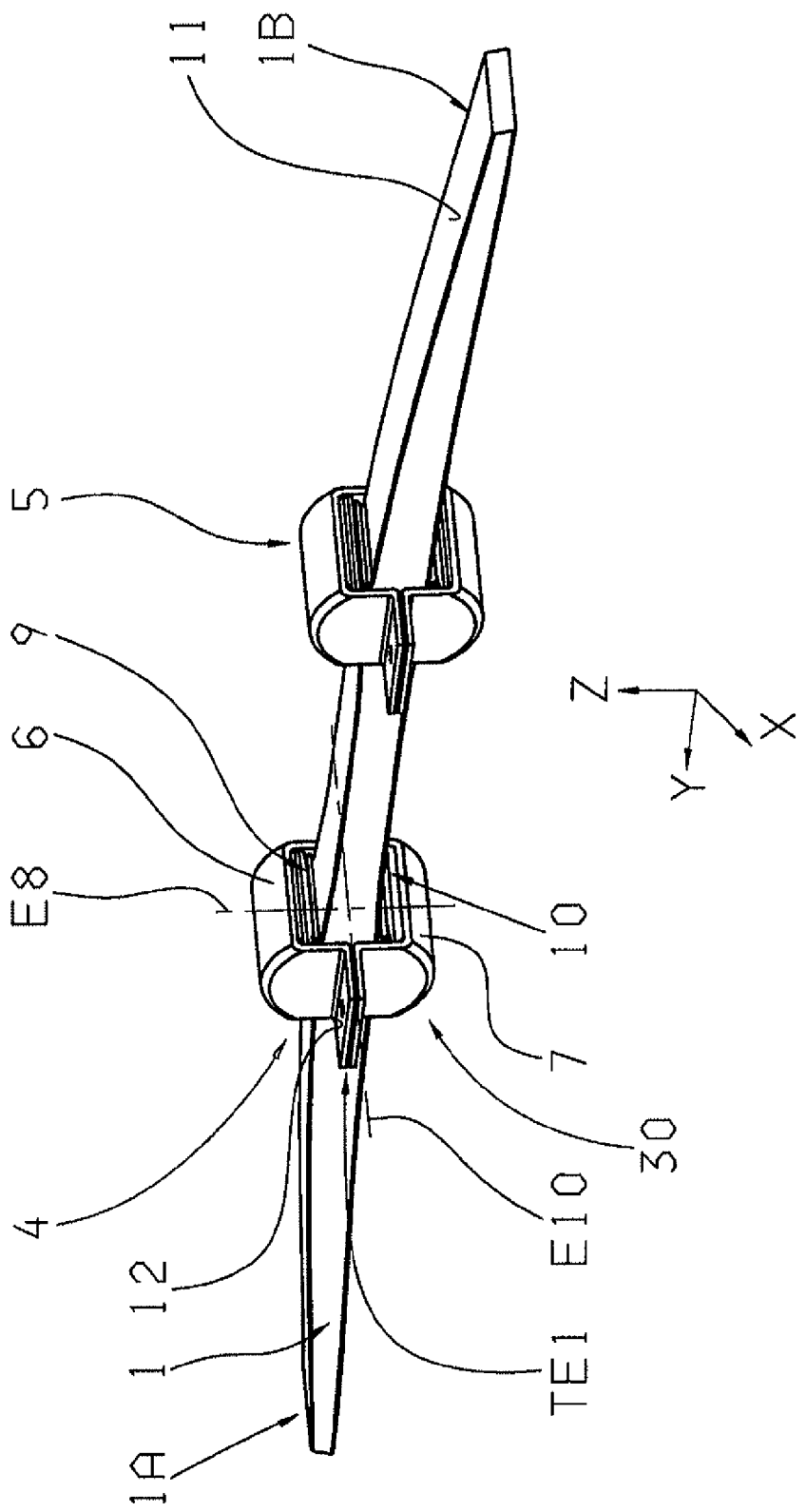
FIG. 7 a representation of a transverse leaf spring, corresponding to FIG. 2, that is supported at a vehicle chassis by means of a second embodiment of the bearing mechanism according to the invention.

FIG. 7 shows a representation of the transverse leaf spring 1 corresponding to FIG. 2, that is connected to the vehicle chassis via a second embodiment of the bearing mechanisms 4 and 5. The bearing mechanisms 4 and 5 basically have the same structure, which is why the following description references only the bearing mechanism 4.

The outer bearing shells 6 and 7 are formed as sheet metal shells that can be connected to the auxiliary frame or directly to the vehicle chassis. Departing from this, the outer bearing shells can also be designed as cast parts or as cold mass forming parts.

The outer bearing shells 6 and 7 have a symmetrical shape to reduce production costs. In the previously described manner, the outer bearing shells 6 and 7 comprise the insertion devices 9 and 10 that are each formed from multiple parts and comprise one element implemented elastically at least in sections, which is shown in more detail in each of the sectional representations 8 to 10 or 11 and 12.

Figure 8:
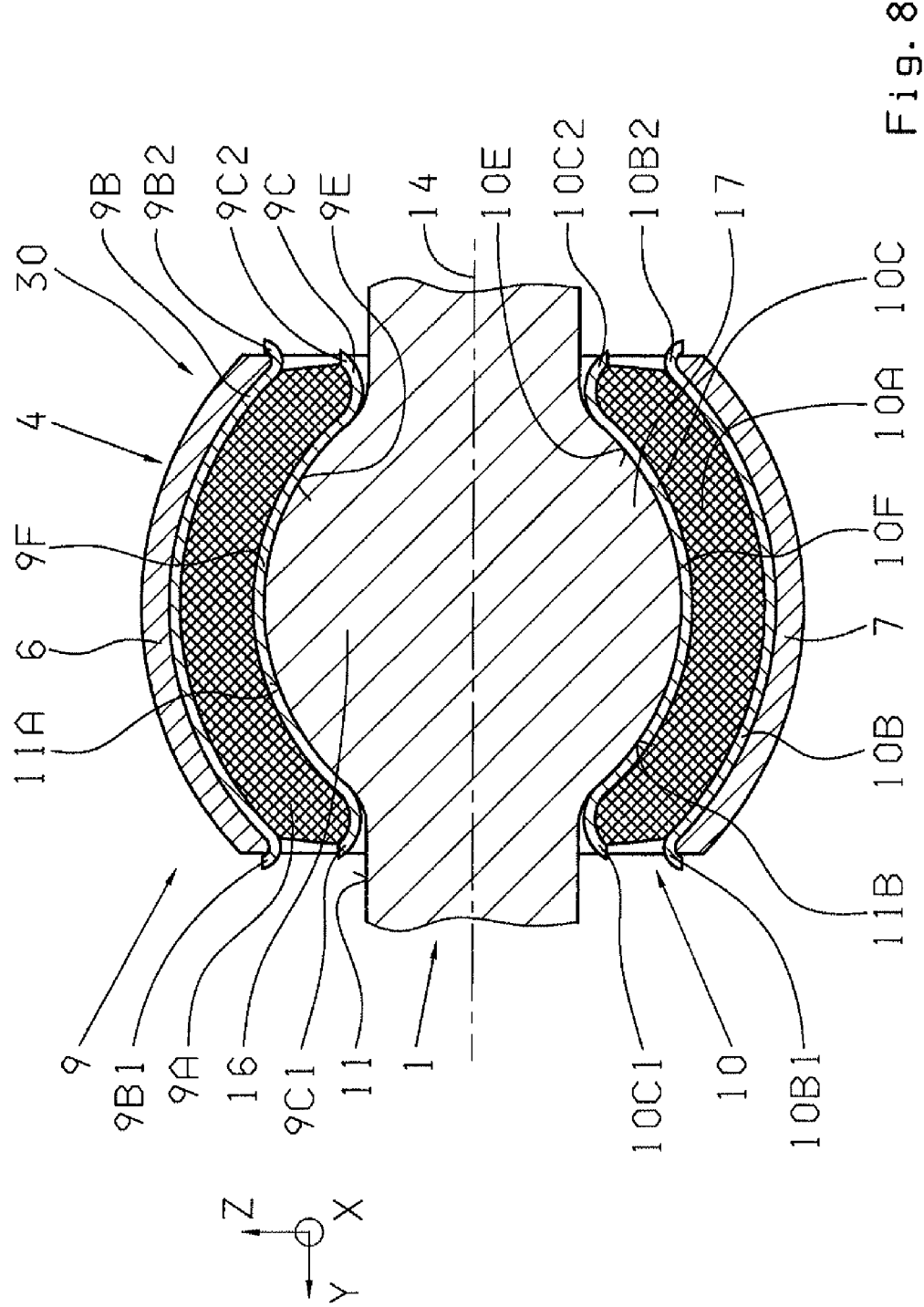
FIG. 8 a longitudinal sectional view of the bearing mechanism according to FIG. 7 along a sectional plane E8 shown in more detail in FIG. 7.
Figure 9:
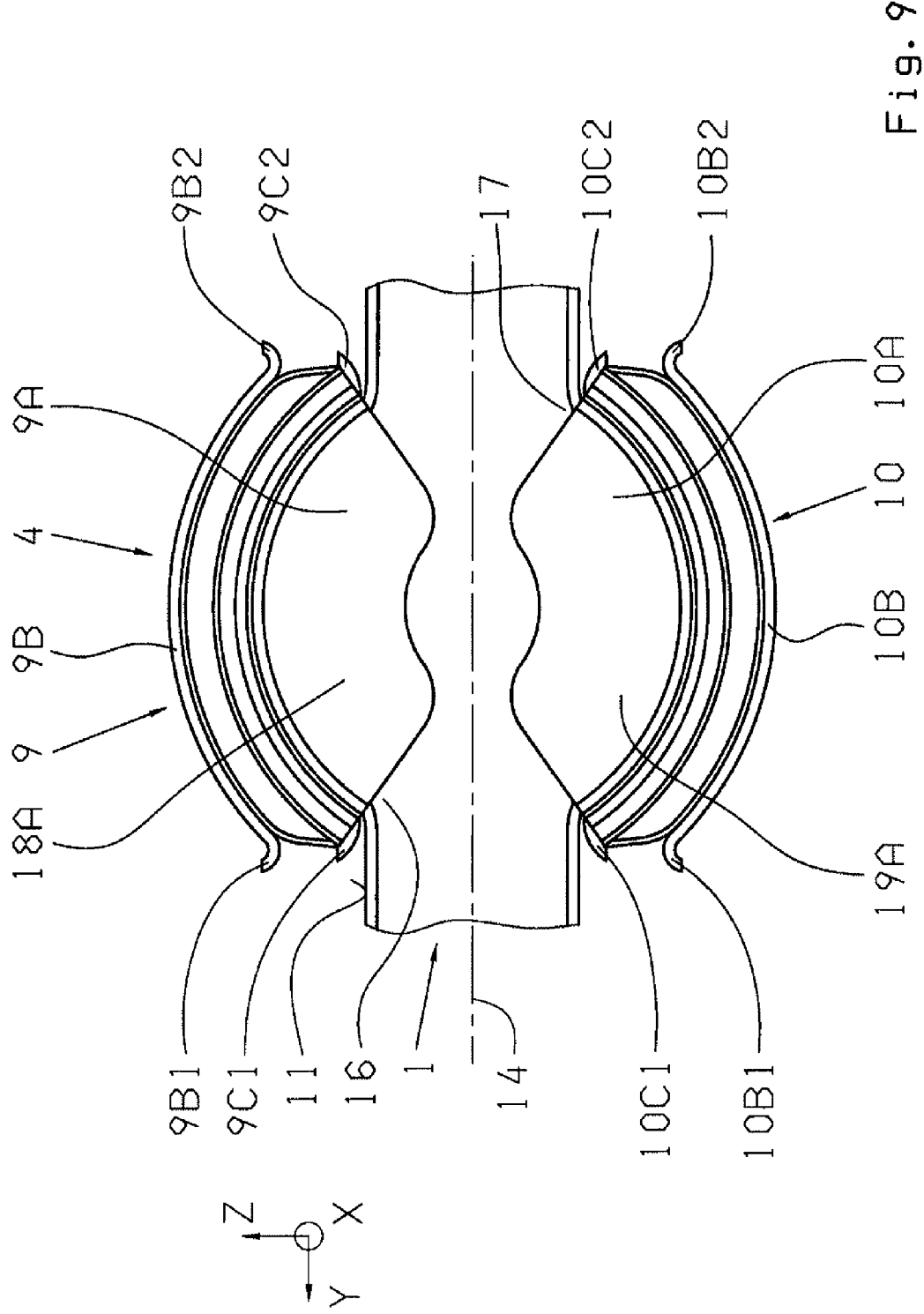
FIG. 9 a side view of the bearing mechanism according to FIG. 7.
Figure 10:
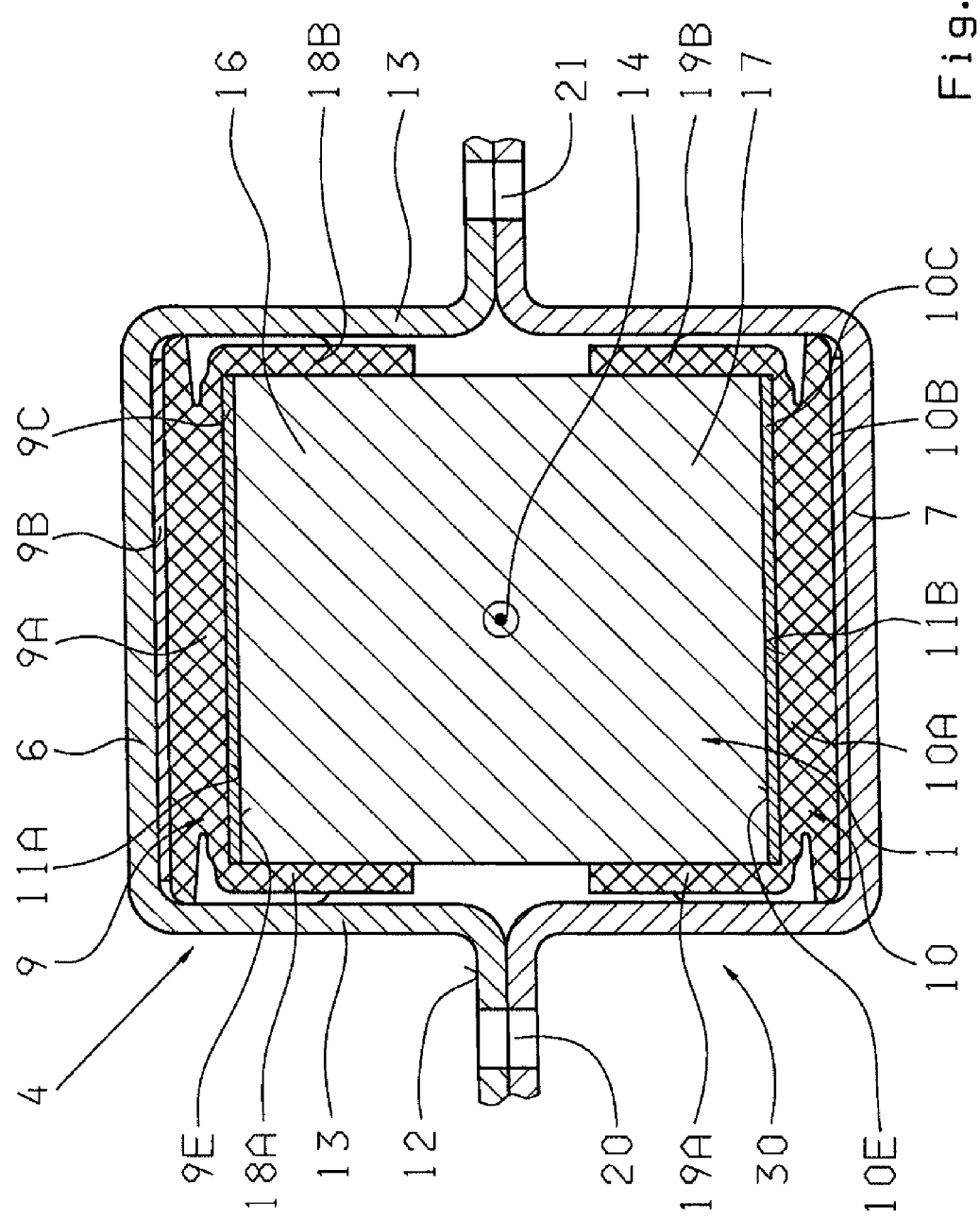
FIG. 10 a cross-sectional view of the bearing mechanism according to FIG. 7 along a sectional plane E10 shown in more detail in FIG. 7.

In the example embodiment of the transverse leaf spring 1 represented in FIG. 8 to FIG. 10, the transverse leaf spring comprises elevations 16, 17 in each of the contact regions of the bearing mechanism 4 at the transverse leaf spring 1, onto which the insertion devices 9 and 10 are placed with the layer elements 9A to 9C or 10A to 10C. The elevations 16 and 17 substantially take on the function of the insertion parts 9D or 10D of the insertion devices 9 and 10 according to FIG. 2 to FIG. 5.

In order to be able to adjust the bearing mechanism 4 to the desired bearing stiffness, the insertion devices 9 and 10, differing from the embodiment represented in FIG. 8 to FIG. 10, can be formed with additional layer elements increasing the stiffness and formed as an insertion metal sheets, or with recesses in the region of the layer elements 9A or 10A.

The layer elements 9C or 100 of the insertion devices 9 and 10, in the example embodiment represented in FIG. 8 to FIG. 10, are disposed between the resilient layer elements 9A or 10A and the transverse leaf spring 1 and, depending on the respective application case, can be produced from metal, plastic, reinforced plastic or fiber reinforced plastic. The layer elements 9C and 10C are connected by vulcanization to each of the resilient layer elements 9A and 10A, where depending on the application case one of the layer elements 9B, 9C, or 10B, 10C can be omitted.

The layer element disposed directly on the transverse leaf spring 1 must be designed such that the surface 11 of the transverse leaf spring 1 is not damaged by the layer element during operation. For this reason, the layer elements 9B, 9C and 10B, 10C in the end regions 9B1, 9B2, 9C1, 9C2, 1081, 10B2, 10C1, 10C2 thereof are designed with ends that are rounded and bent toward the outside with respect to the surface 11 of the transverse leaf spring 1, where the curved or bent up ends 9B1, 9B2 and 1081, 10B2 of the layer elements 9B and 10B have a centering or positioning function of the insertion devices 9 and 10 with respect to the outer bearing shells 6 and 7, and stop or prevent slipping of the insertion devices 9 and 10 with respect to the outer bearing shells 6 and 7 during extreme bearing loads.

FIG. 9 shows a side view of the transverse leaf spring 1 and the bearing mechanism 4 without the outer bearing shells 6 and 7. The representation according to FIG. 9 highlights that the resilient layer elements 9A and 10A are each formed with laterally disposed elastic stop regions 18, 19 that in the assembled state of the bearing mechanism 4 are disposed between the lateral surfaces of the transverse leaf spring 1 extending in a vertical direction z of the vehicle, and the outer bearing shells 6 and 7. The insertion devices 9 and 10 are positioned in the longitudinal direction x of the vehicle, via the stop regions 18 and 19, and offer a soft support of the transverse leaf spring 1 at the outer bearing shells 6 and 7 in the x-direction or the longitudinal direction of the vehicle.

In contact regions facing the transverse leaf spring 1 and/or in the contact regions facing the outer bearing shells, the stop regions 18 and 19 can be formed having projections and/or recesses oriented at least approximately in the longitudinal direction of the vehicle, in order to represent different bearing stiffnesses of the bearing mechanism 4 via the bearing shift. Additionally, the stop regions of the insertion devices 9 and 10 can be designed differently in front and in the back with respect to the longitudinal direction of the vehicle, in order to be able to represent correspondingly different bearing characteristics.

FIG. 10 represents the stop regions 18A, 18B and 19A, 19B of the insertion devices 9 and 10 on both sides of the transverse leaf spring 1 in the longitudinal direction of the vehicle. The outer bearing shells 6 and 7 are connected together in the region of bore holes 20, 21 by means of the bolt device 8 not represented in more detail in FIG. 10, via at least two bolt elements, and can be fastened additionally to the vehicle chassis or to an auxiliary frame.

Figure 11:
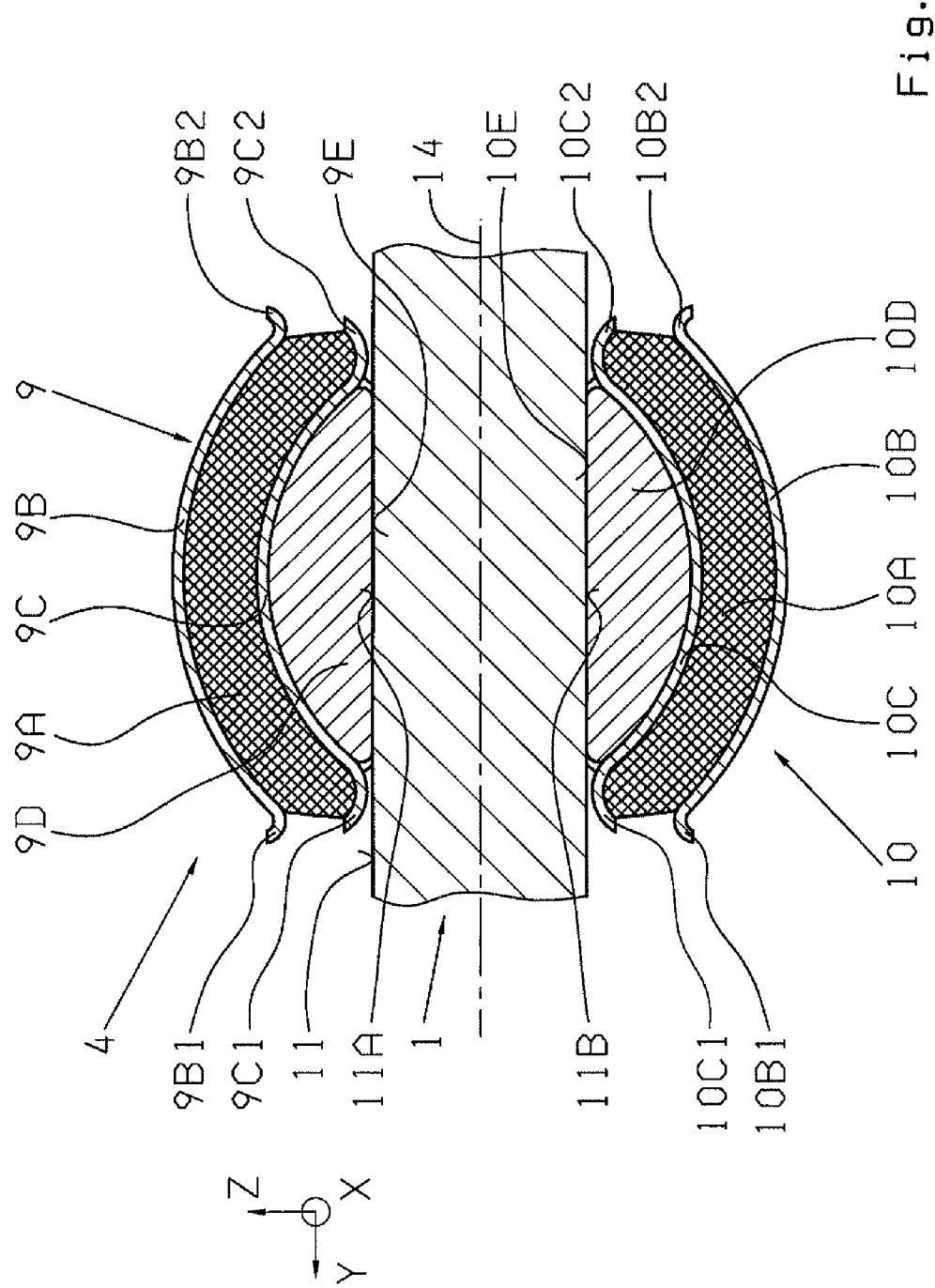
FIG. 11 a representation according to FIG. 8 of a second embodiment of the bearing mechanism depicted in FIG. 7.
Figure 12:
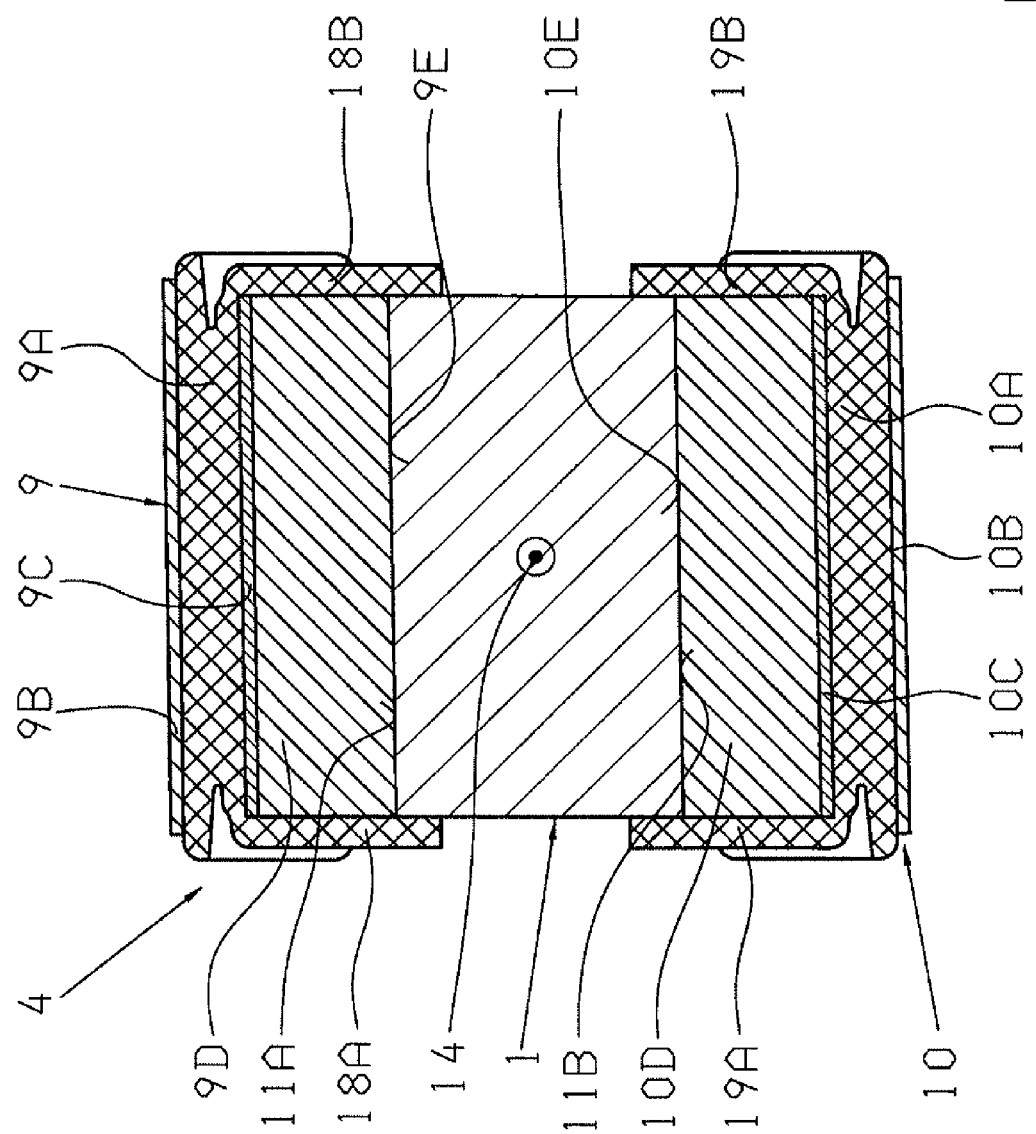
FIG. 12 a view according to FIG. 10 of the bearing mechanism according to FIG. 11.

FIG. 11 and FIG. 12 show a further example embodiment of the transverse leaf spring 1 and the bearing mechanism 4 or 5, in which the transverse leaf spring 1 is formed without the elevations 16 and 17 of the transverse leaf spring 1 in the contact region of the layer device 4 according to FIG. 8 to FIG. 10, and the insertion devices 9 and 10 are again designed with insertion parts 9D and 10D. The insertion parts 9D and 10D transfer the force from the transverse leaf spring 1 to the multi-part insertion devices 9 and 10 that are resilient at least in sections, which in turn introduce the acting forces into the outer bearing shells 6 and 7.

The insertion parts 9D and 10D in the bearing mechanism 4 according to FIG. 11 and FIG. 12 are each disposed between the surface 11 of the transverse leaf spring and the layer elements 9C or 10C. The further design of the insertion devices 9 and 10 corresponds substantially to the design of the insertion devices 9 and 10 according to FIG. 8 to FIG. 10.

Depending on the application case, the insertion parts 9D and 10D of the insertion devices 9 and 10 can be connected to the resilient layer elements 9A or 10A, by vulcanization for example, in order to simplify assembly of the bearing mechanism 4, and to possibly provide a resilient coating of the insertion parts 9D and 10D which in a simple manner prevents or reduces damage to the surface 11 of the transverse leaf spring 1 during operation.

Figure 13:
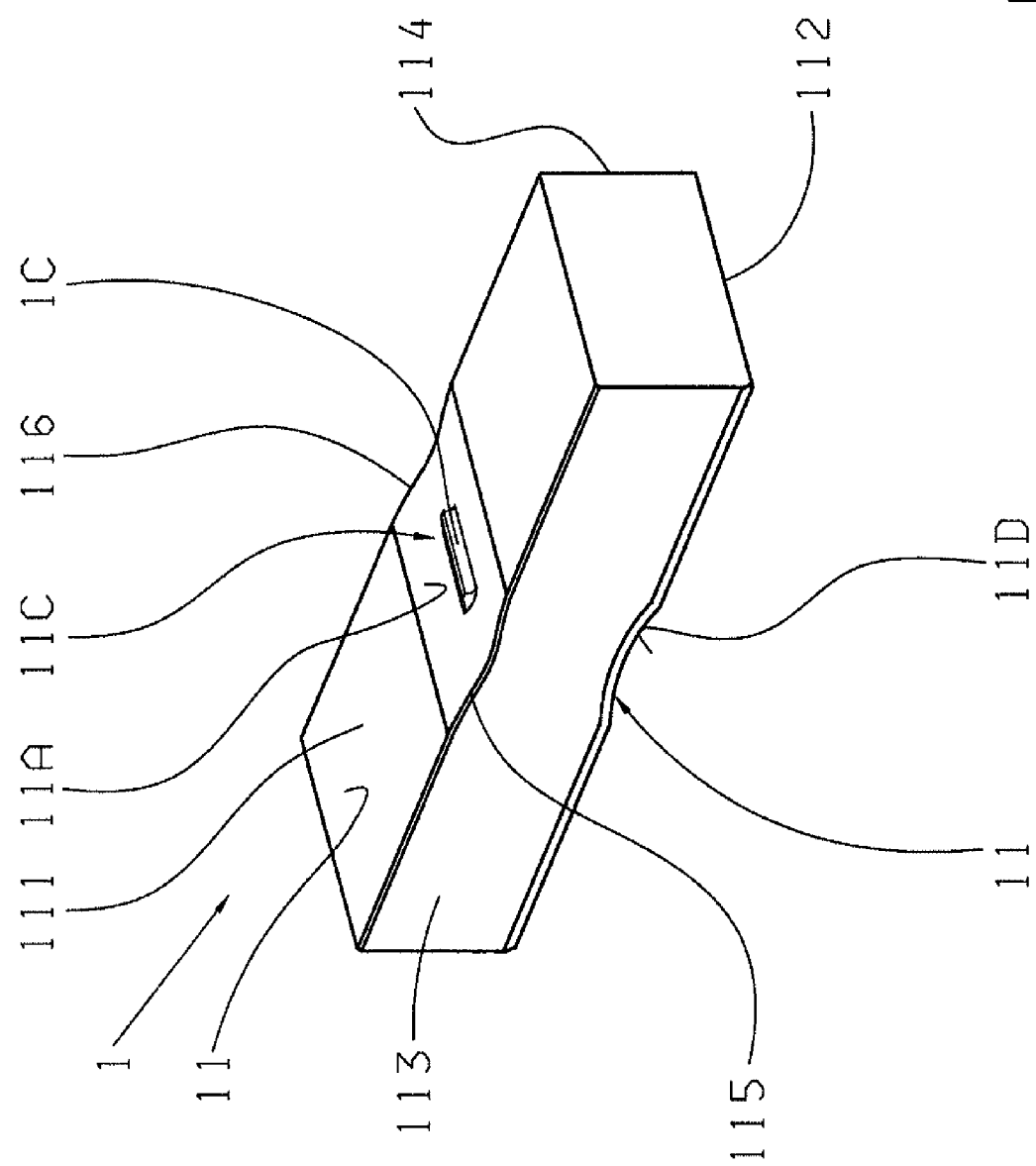
FIG. 13 to FIG. 21 each, a partial view of different embodiments of the transverse leaf spring in an assembly region of the bearing mechanism according to the invention.

FIG. 13 to FIG. 21 show embodiments of the regions of the transverse leaf spring 1 producing the form-locking between transverse leaf spring 1 and the bearing mechanism 4. The embodiments represented in FIG. 13 to FIG. 21 differ only in partial regions, which is why in the following description only the differences between the individual embodiment are described, and the description of FIG. 13 is referenced regarding the further functionality of the recesses.

In the embodiment represented in FIG. 13, the transverse leaf spring 1 is strongly compressed in the vertical direction of the vehicle, or in the z-direction, and formed with the same width as in the remaining cross-sectional region of the transverse leaf spring 1. Thereby the compressed region, or the region of the recesses 11C and 11D of the transverse leaf spring 1, have an increased portion of fibers. Due to the recesses 11C and 11D, increased transverse forces acting in the region of the bearing mechanism 4 can be reliably introduced from the transverse leaf spring 1 into the bearing mechanism 4. The transition between the recesses 11C and 11D and the adjacent surface 11 of the transverse leaf spring 1 is formed optimized for stress via a cosine contour having tangential starting and ending shapes so that during operation only minor stress increases occur in the region of the recesses 11C and 11D.

The regions 1C and 1D of the transverse leaf spring 1 substantially take on the task of centering the bearing mechanism 4 on the transverse leaf spring 1 in the longitudinal and transverse direction, while the regions 1C and 1D are mainly not involved, or only to a small extent, in the transmission of force between the bearing mechanism 4 and the transverse leaf spring 1. The shapes of the regions 1C and 1D are each designed with smooth transitions to the recesses 11C and 11D, where mainly resin accumulates in the regions 1C and 1D during production of the transverse leaf spring. Due to this manner of processing, an abrupt redirection of the fiber in the cross-section of the transverse leaf spring 1 is avoided.

Figure 14:
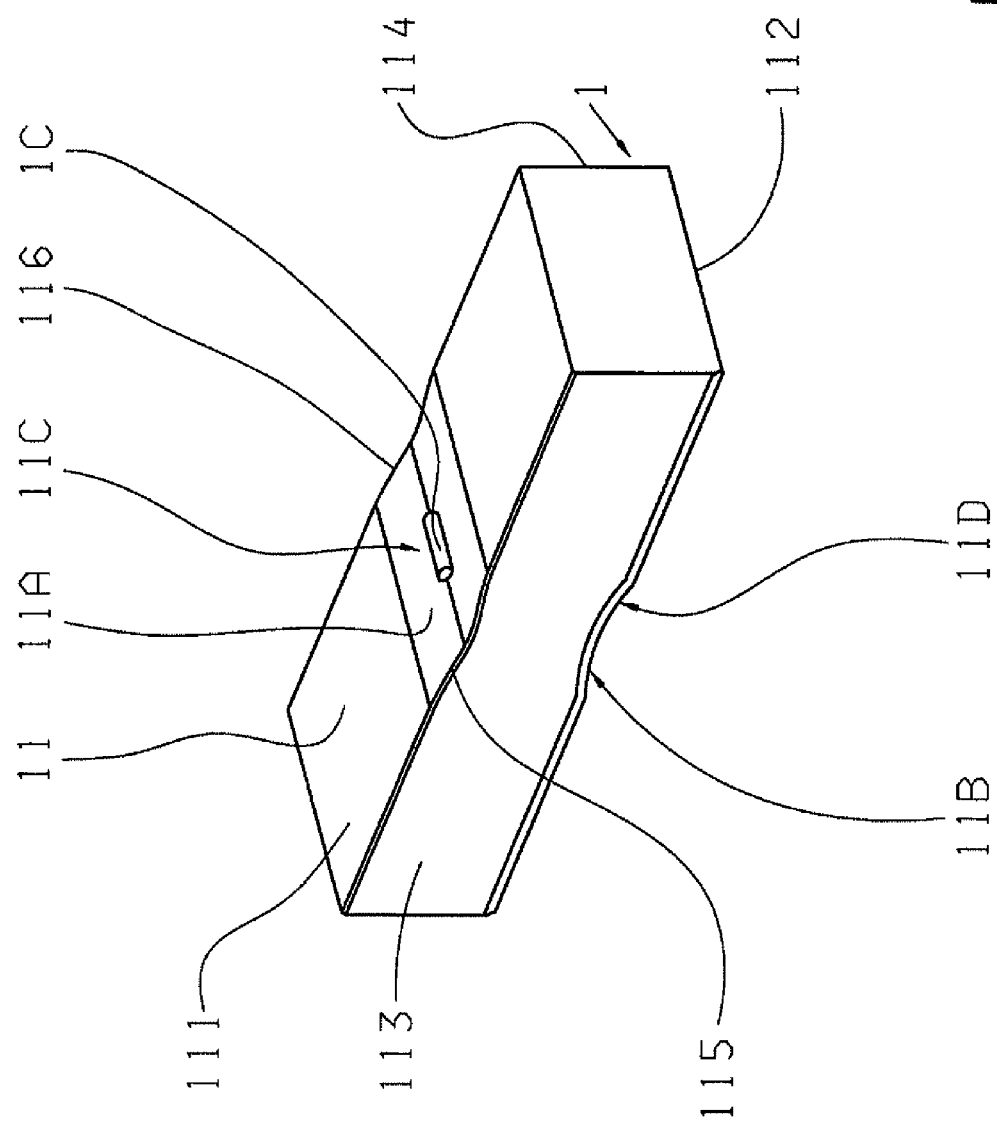

In the embodiment of the transverse leaf spring 1 represented in FIG. 14, the regions 1C and 1D are designed with a transition to the recesses 11C and 11D that is less smooth, and having an outer shape that is substantially nearly semi-cylindrical. Compared to the shape of the regions 1C and 1D represented in FIG. 13, the semi-cylindrical outer shape facilitates a simpler production of the tool which is used for manufacturing the transverse leaf spring 1. The regions 1C and 1D of the example embodiment of the transverse leaf spring 1 represented in FIG. 14, substantially take on only the centering of the bearing mechanism 4 at the transverse leaf spring 1 in the longitudinal and transverse direction, and are not involved, or only minimally involved, in the transmission of forces between the bearing mechanism 4 and the transverse leaf spring 1. The shapes of the regions 1C and 1D are designed such that the fibers of the transverse leaf spring 1 do not have any substantial redirection, and that the stiffness of the transverse leaf spring 1 corresponds to the stiffness of transverse leaf springs designed without the regions 1C and 1D.

Figure 15:
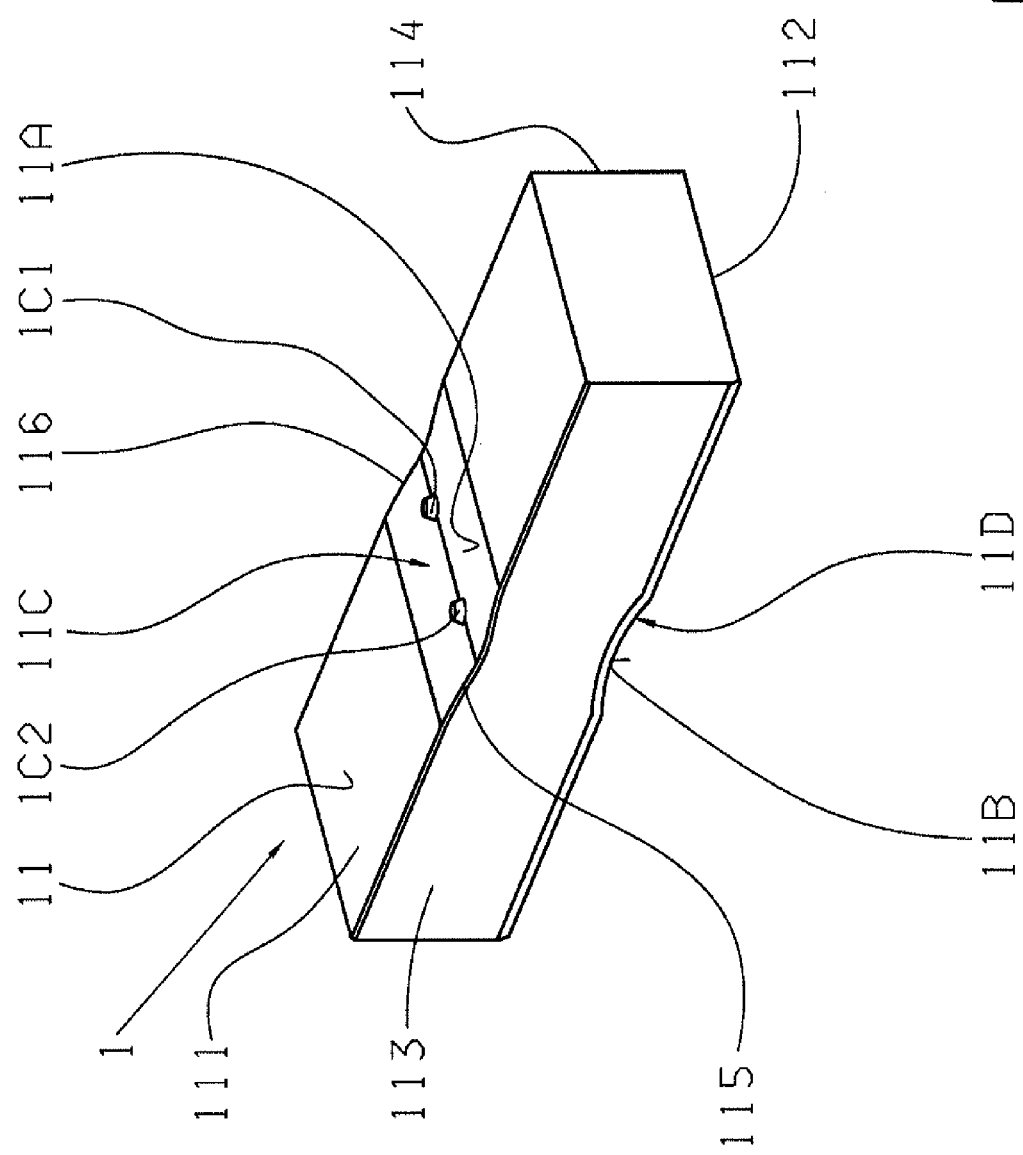

In the example embodiment of the regions 1C and 1D shown in FIG. 15, these regions are formed having two noses designed at least approximately in the shape of a truncated cone, disposed in the regions of the outer sides of the transverse leaf spring, and using these noses the bearing mechanism 4 is centered on the transverse leaf spring 1. The regions 1C and 1D again essentially accumulate resin in order to prevent abrupt redirection of the fibers in the region of the recesses or the regions 1C and 1D.

Figure 16:
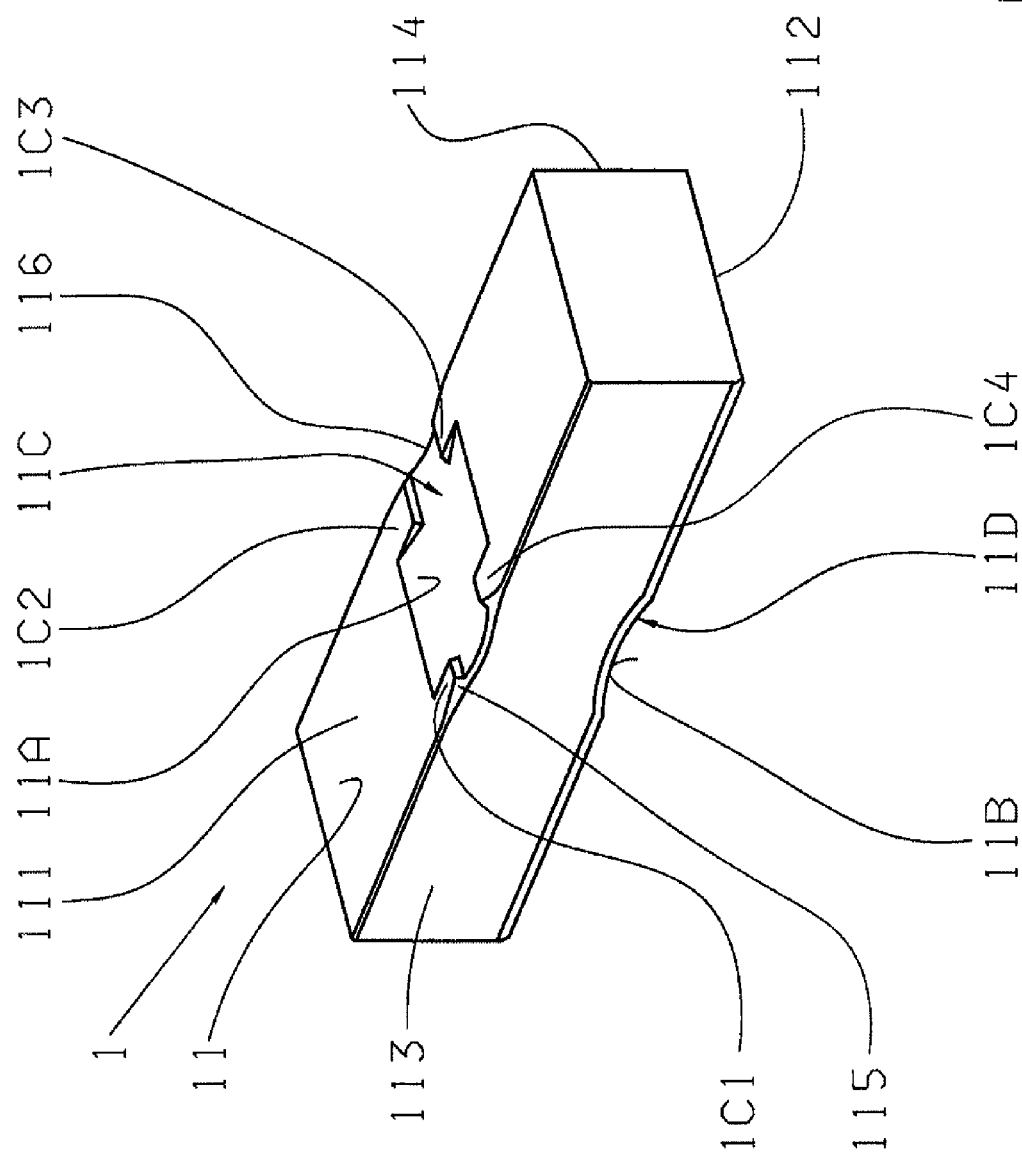
Figure 17:
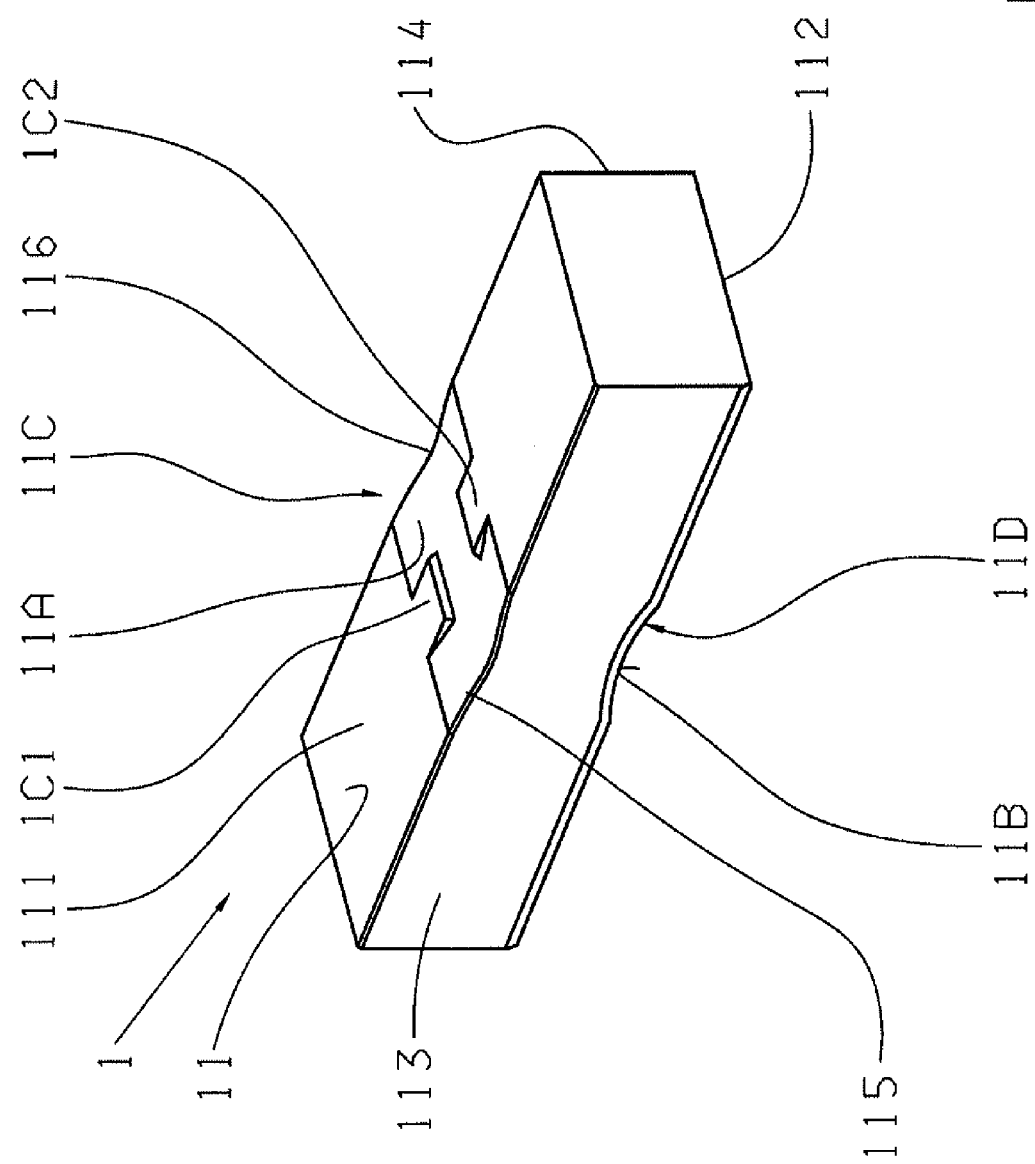

In the further example embodiment of the transverse leaf spring 1 according to FIG. 16, the regions 1C and 1D are formed as noses 1C1 to 1C4, disposed in the region of the outer sides of the transverse leaf spring 1, where the transitions between the recesses 11C and 11D and the noses 1C1 to 1C4 are formed again optimized for stress. In the example embodiment of the transverse leaf spring 1 according to FIG. 17, the regions 1C and 1D are formed with noses 1C1 and 1C2 disposed in the center region of the transverse leaf spring 1.

Figure 18:
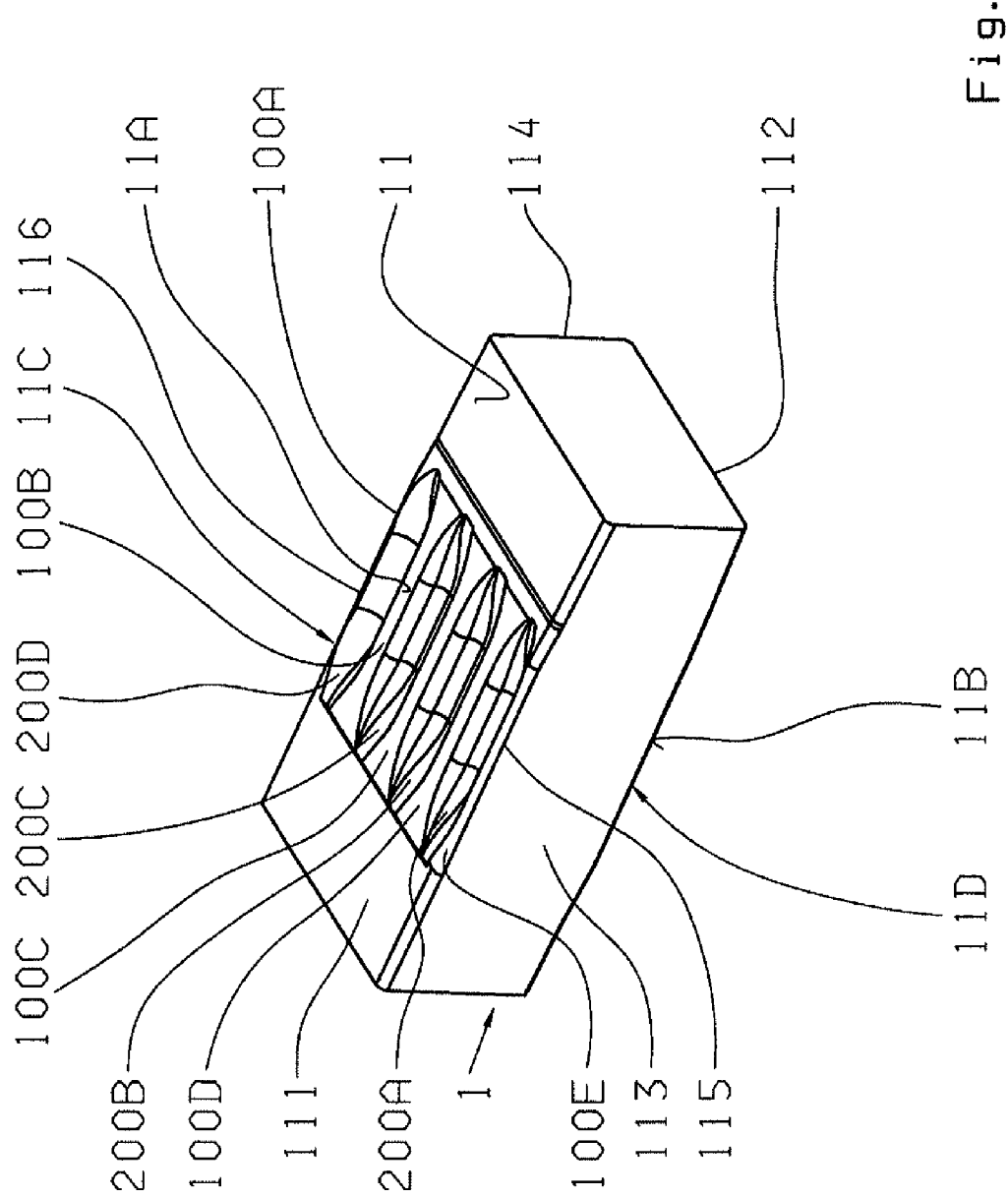

The further embodiment of the transverse leaf spring 1 represented in FIG. 18, the region of the recesses 11C and 11D of the transverse leaf spring 1, is formed with ribs 100A to 100E and grooves 200A to 200D that in the compressed state of the leaf spring 1 alternate and extend in the transverse direction of the vehicle, and that support the function of the regions 1C and 1D. The number of ribs 100A to 100E is selected depending on the width of the transverse leaf spring 1 and the depth of the grooves 200A to 200D, where the side ribs 100A and 100E can be omitted if necessary. In the region of the grooves 200A to 200D, the fiber portion of the transverse leaf spring is compressed or partially displaced onto the ribs 100A to 100E, where the transitions between the ribs 100A to 100E and the grooves 200A to 200D as well as between the remaining surface 11 of the transverse leaf spring 1, are designed optimized for stress so that only minimal stress increases are generated in the transitions. The depth of the grooves 200A to 200D varies in the transverse and longitudinal direction of the vehicle, each substantially having a maximum in the center region, and minimums at opposing edge regions in the transverse vehicle direction.

Figure 19:
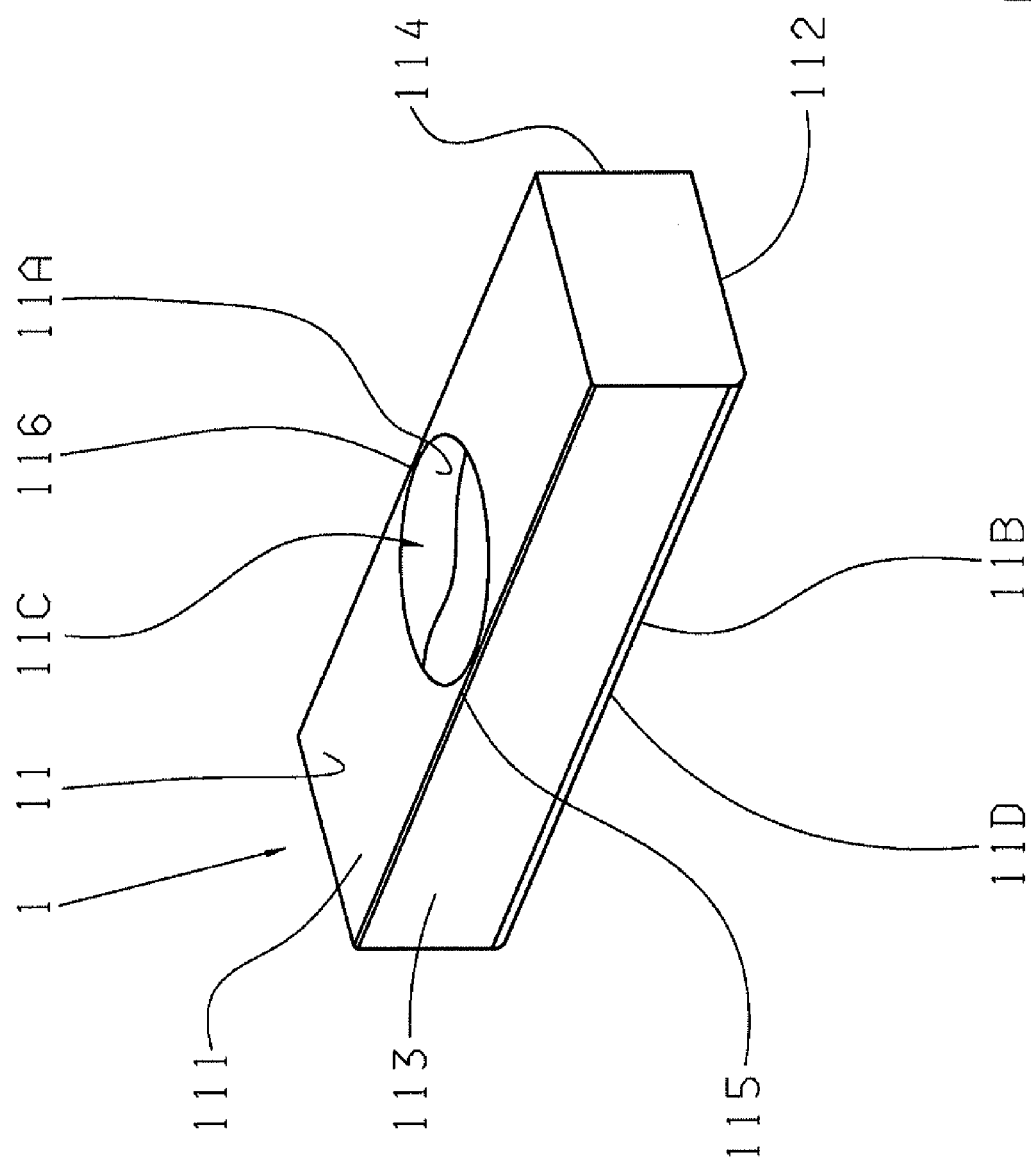

The embodiment of the transverse leaf spring 1 represented in FIG. 19 is formed with recesses 11C and 11D each of which comprises a rotated cosine contour, and is stamped into the surface 11 of the transverse leaf spring 1. In the assembled state of the transverse leaf spring 1, the recesses 11C and 11D are each bounded, in the longitudinal direction of the vehicle x, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D. As a result of this contour only a minimal stress increase arises in the transition between the bearing location of the transverse leaf spring 1 and the remainder of the surface 11 of the transverse leaf spring 1 surrounding the bearing location. The width of the transverse leaf spring 1 remains substantially uniform, whereby in the cross section of the transverse leaf spring an increased portion of fibers is present in each of the regions of the recesses 11C and 11D.

Due to these recesses 11C and 11D each represented by an indentation, increased transverse and longitudinal forces can be easily transferred from the bearing mechanism 4 into the transverse leaf spring 1. During assembly of the bearing mechanism 4, the insertion devices 9 and 10 are centered on the transverse leaf spring 1 in both the longitudinal and transverse direction of the vehicle by means of the recesses 11C and 11D.

Depending on the present application case, other suitable rotationally symmetric shapes can be provided for the shape of the recesses of the transverse leaf spring, such as a truncated cone, a hemisphere or the like, each having rounded transitions to the remaining surface 11 of the transverse leaf spring 1.

Figure 20:
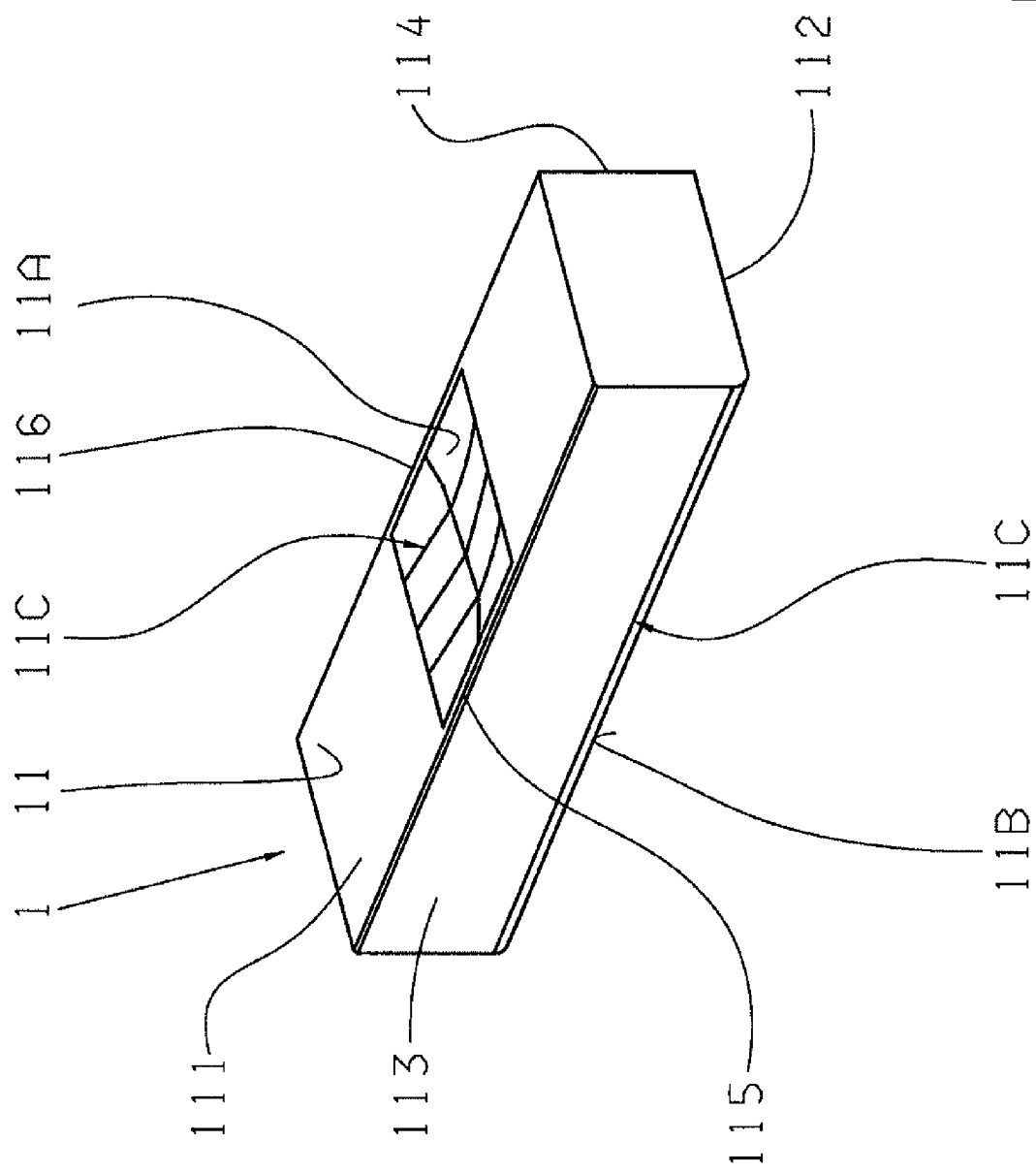

In the example embodiment of the transverse leaf spring 1 according to FIG. 20, the recesses 11C and 11D of the transverse leaf spring 1 are stamped into the transverse leaf spring with a rounded rectangular shape having a cushion-like shape. The contour can be produced by two perpendicularly overlapping cosine contours, which guarantees a minimal stress increase in the region between the bearing location of the bearing mechanism 4 of the transverse leaf spring 1 and the remaining surface 11 of the transverse leaf spring 1. Principally, the possibility exists to design the transverse leaf spring also in the region of the recesses 11C and 11D with the same width as in the remaining progression of the transverse leaf spring 1, whereby an increased portion of fibers is present in the cross section of the transverse leaf spring in the region of the recesses 11C and 11D. In the assembled state of the transverse leaf spring 1, the recesses 11C and 11D are each bounded, in the longitudinal direction of the vehicle x, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D.

Figure 21:
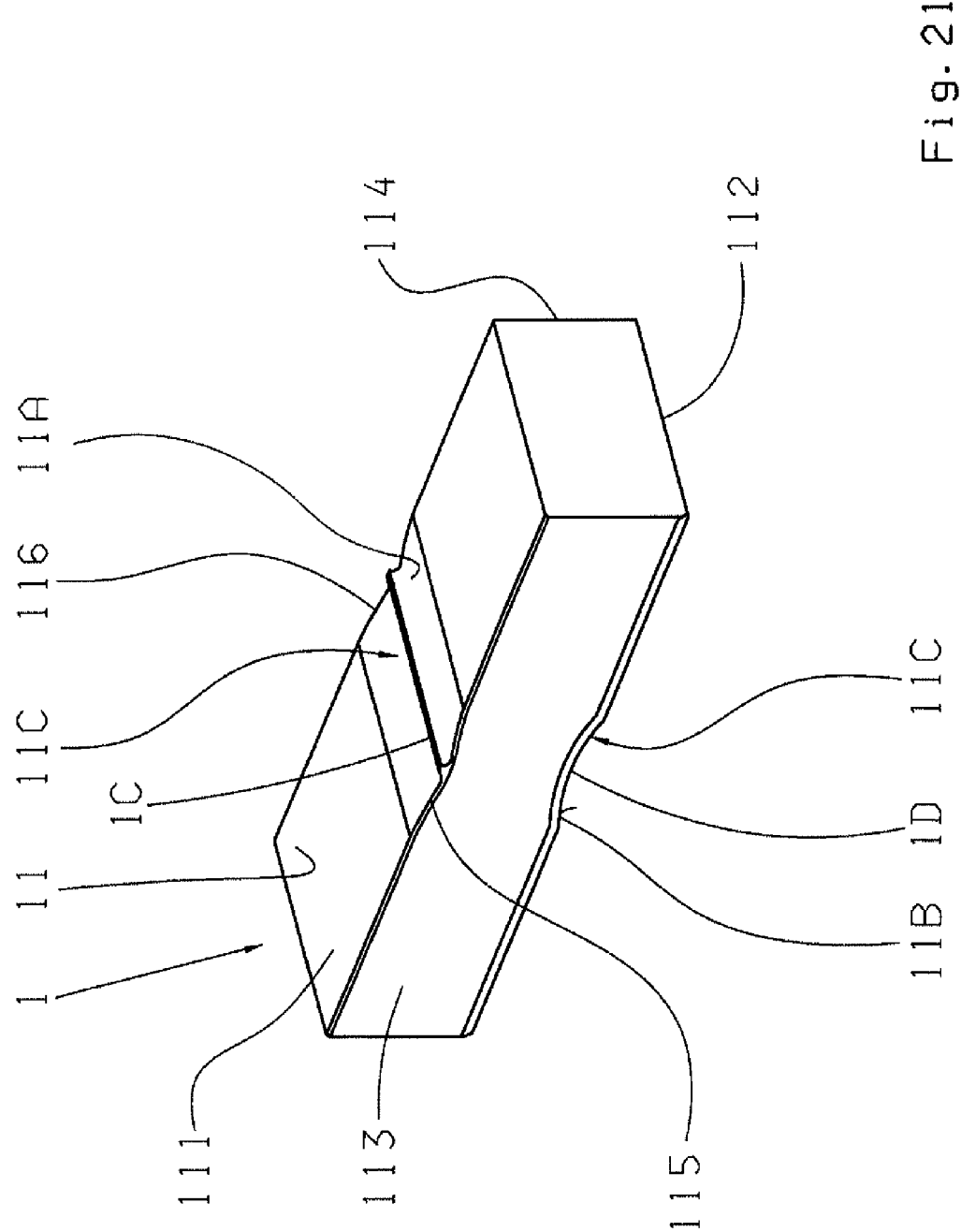

The embodiment of the transverse leaf spring 1 represented in FIG. 21, in the region of the recesses 11C and 11D, comprises a region 1C or 1D each extending over the entire width of the transverse leaf spring 1, where during production the transverse leaf spring 1 is strongly compressed in the vertical direction of the vehicle, or z-direction. This in turn leads to an increased portion of fiber in the contact region of the bearing mechanism 4. The main function of the regions 1C and 1D is centering the bearing mechanism 4 on the transverse leaf spring 1 in the longitudinal direction. If the regions 1C and 1D are designed, starting from a center region of the transverse leaf spring 1, increasing slightly in the direction toward the outsides of the transverse leaf spring 1 in the longitudinal direction of the vehicle, then it is also possible to center the bearing mechanism 4 on the transverse leaf spring 1 in the transverse direction.

Basically, it is also possible to, In the assembled state of the transverse leaf spring 1, to bound the recesses 11C and 11D of the embodiments shown in FIG. 13 to FIG. 18 as well as FIG. 21 in the longitudinal direction of the vehicle x, by edge regions 115 and 116 of the top side 111 and the bottom side 112, formed between a top side 111 and a bottom side 112 and lateral surfaces 113, 114 of the transverse leaf spring 1, where in the region of the edge regions the thickness of the transverse leaf spring 1 preferably corresponds substantially to the thickness outside of the recesses 11C and 11D.

In general, the subject matter according to the invention described above, and the different embodiments of the subject matter according to the invention offer the possibility to support forces and torques applied during operation of a vehicle in the region of a transverse leaf spring without through bores in the transverse leaf spring to the desired extend in the region of the vehicle chassis. Additionally, this requirement is also guaranteed without introducing a foreign part into the transverse leaf spring. This means that forces and torques of central bearings can be transferred again onto a transverse leaf spring without negatively impacting the durability of a transverse leaf spring by holes for bolts or rivets, or other strong redirections of the fibers.

The bearing mechanisms according to the invention are formed with the respectively required high stiffness, and the surface of a transverse leaf spring is not damaged during operation by the appropriately formed bearing mechanisms. Furthermore, the smallest possible stresses during operation occur in the region of the surface of a transverse leaf spring, whereby the transverse leaf spring is not damaged by the bearing mechanism even in the case of alternating loading. Relative movements in the region between the surface of the transverse leaf spring and the bearing mechanisms or the central bearing are avoided in a constructively simple and space-saving manner. The bearing design according to the invention additionally offers in a simple manner the possibility that the torsion axis lies parallel to an x-y plane, and in the longitudinal direction, or x-direction, of the vehicle intersects with the neutral fiber of the transverse leaf spring. An exact positioning of the bearing mechanism on the transverse leaf spring is likewise guaranteed both in the x- and y-direction, whereby a transverse leaf spring can operate with high precision.

If needed, the bearing mechanism according to the invention makes it possible to fasten the bearing leaf spring directly to the vehicle chassis or to the auxiliary frame, without insulation of an auxiliary frame with respect to the vehicle chassis.

The bearing mechanism according to the invention can, without costly constructive measures, also be integrated into different wheel suspension configurations, which are formed having a transverse leaf spring and similar fiber composite components.

The upper and lower halves of the bearing mechanism 4 with respect to the vertical axis z of the vehicle can, depending on the respectively present application, be formed both symmetrically as well as with small asymmetries, where bearing asymmetries of the bearing mechanism 4 can be utilized in a targeted manner for adjusting the bearing stiffness in the different directions.

REFERENCE CHARACTERS

1 transverse leaf spring
1A, 1B end region
1C, 1D region
1C1 to C4 nose
2, 3 outer bearing
4, 5 bearing mechanism
6 outer bearing shell
6A projection
7 outer bearing shell
7A projection
8 bolt device
8A to 8D bolt element
9 insertion device
9A layer element
9A1, 9A2 bulge-like end region
9A3, 9A4 cavity
9B layer element
9B1, 9B2 end region
9C layer element
9C1, 9C2 end region
9D insertion part
9D1 recess
9E contact surface
9F receiving device
10 insertion device
10A layer element
10A1, 10A2 bulge-like end region
10A3, 10A4 cavity
10B layer element
10B1, 10B2 end region
10C layer element
10C1, 10C2 end region
10D insertion part
10D1 recess
10E contact surface
10F receiving device
11 surface of the transverse leaf spring
11A, 11B support surface
11C, 11D recess of the transverse leaf spring
12 contact surface of the bearing shell
13 web
14 neutral fiber
16, 17 elevation
18, 19 stop region
20, 21 bore hole
30 outer bearing shell device
111 top side of the transverse leaf spring
112 bottom side of the transverse leaf spring
113, 114 lateral surface of the transverse leaf spring
115, 116 edge region of the transverse leaf spring
100A to 100E rib
200A to 200D groove
E3 to E10 sectional plane
TE1, TE2 separation plane
x longitudinal direction of the vehicle
y transverse direction of the vehicle
z vertical direction of vehicle

The invention claimed is:

1. A bearing mechanism (4, 5) of a transverse leaf spring (1) that is mounted in a region of a vehicle axle of a vehicle, the bearing mechanism (4, 5) comprising:
an outer bearing shell device (30);
insertion devices (9, 10) with at least some regions thereof being encompassed by the outer bearing shell device (30), and each of the insertion devices (9, 10) comprising at least two layer elements (9A to 9C and 10A to 10O) having different stiffnesses;
the insertion devices (9, 10), in an assembled state, each being disposed between the outer bearing shell device (30) and the transverse leaf spring (1);
layer elements (9C and 10O), formed with greater stiffness, being positioned between the transverse leaf spring (1) and the layer elements (9A and 10A) formed with lower stiffness;
the layer elements (9B, 9C and 10B, 10C), formed with greater stiffness, being half-shell shaped and convex between end regions (9B1, 9B2, 9C1, 9C2 and 10B1, 10B2, 10C1, 10C2) oriented in an axial direction of the transverse leaf spring (1), and the end regions (9B1, 9B2, 9C1, 9C2 and 10B1, 10B2, 10C1, 10C2) of the layer elements (9B, 9C and 10B, 10C) comprising regions that are curved concavely with respect to a surface (11) of the transverse leaf spring (1), free ends of which point away from the surface (11) of the transverse leaf spring (1), and the layer elements (9C and 10C) formed with greater stiffness joining the layer elements (9A and 10A) formed with lower stiffness, and the transverse leaf spring (1) encompass sections of the layer elements (9A and 10A) formed with lower stiffness, by way of the ends thereof, in a form-locking manner.

2. The bearing mechanism according to claim 1, wherein further layer elements (9B and 10B), having greater stiffness, are provided between the layer elements (9A and 10A), formed with lower stiffness, and the outer bearing shell device (30).

3. The bearing mechanism according to claim 2, wherein the layer elements (9A and 10A), formed with lower stiffness, and the further layer elements (9B and 10B), having greater stiffness, which join the outer bearing shell device (30), encompass sections of the outer bearing shell device (30), by way of the free ends thereof, in a form-locking manner.

4. The bearing mechanism according to claim 1, wherein the outer bearing shell device (30) comprises two outer bearing shells (6, 7) that are connectable together so as to encompass at least sections of the insertion devices (9, 10).

5. The bearing mechanism according to claim 4, wherein the insertion devices (9, 10) are connectable to the outer bearing shells (6, 7) and the transverse leaf spring (1) via a bolt device (8) which also connects the outer bearing shells (6, 7) together and to a vehicle chassis at least in a force locking manner.

6. The bearing mechanism according to claim 4, wherein the layer elements (9A and 10A), formed with the lower stiffness, encompass the outer bearing shells (6, 7) with bulge-like end regions and, in the assembled state, point in a transverse direction of the vehicle, and the outer bearing shells (6, 7) engage with the bulge-like end regions (9A1, 9A2 and 10A1, 10A2) of the layer elements (9A and 10A), via projections (6A, 7A).

7. The bearing mechanism according to claim 1, wherein the transverse leaf spring (1) has convex elevations (16, 17), disposed on a top side and a bottom side thereof with respect to a vertical axis (z) of the vehicle, which are contact surfaces for the insertion devices (9, 10).

8. The bearing mechanism according to claim 1, wherein at least nearly semi-cylindrically insertion part (9D and 10D) is disposed between the layer elements (9A and 10C) and the transverse leaf spring (1), and the insertion parts are formed with greater stiffness than the layer elements (9A and 10A), formed with lower stiffness.

9. The bearing mechanism according to claim 8, wherein, in the assembled state, the insertion parts (9D and 10D), in contact regions facing the transverse leaf spring (1), each have a resilient protective coating.

10. The bearing mechanism according to claim 1, wherein at least sections of end regions (9B1, 9B2, 9C1, 9C2 and 10B1, 10B2, 10C1, 10C2) of the layer elements (9B, 9C and 10B, 10C), formed with greater stiffness, have a resilient protective coating.

11. The bearing mechanism according to claim 1, wherein at least the layer elements (9A and 9C), formed with lower stiffness, comprise recesses (9A3, 9A4, 10A3, 10A4).

12. The bearing mechanism according to claim 1, wherein at least one of the insertion devices (9, 10) is each formed in the contact surfaces (9E, 10E) facing a support surface (11A, 11B) of the transverse leaf spring (1), having at least one receiving device (9F, 10F) into which, in the assembled state of the insertion devices (9, 10), a region (1C, 1D) of the transverse leaf spring (1) engages.

13. The bearing mechanism according to claim 12, wherein a region of the support surface (11A, 11B), of the transverse leaf spring (1), is formed with a recess (11C, 11D) into which one of the insertion devices (9, 10) engages.

14. The bearing mechanism according to claim 13, wherein the region (1C, 1D) of the transverse leaf spring (1), which engages with the insertion device (9, 10), is provided adjacent a region of the recess (11C, 11D) of the transverse leaf spring (1).

15. The bearing mechanism according to claim 13, wherein the transverse leaf spring (1), in a region of the support surface (11A, 11B), is formed with a recess (11C, 11D) for engaging with one of the insertion devices (9, 10).

16. A bearing mechanism (4, 5) of a transverse leaf spring (1) for mounting in a region of a vehicle axle of a vehicle, the bearing mechanism (4, 5) comprising:

an outer bearing shell device (30);

insertion devices (9, 10) with at least some regions being encompassed by the outer bearing shell device (30) and each of the insertion devices (9, 10) comprising at least two layer elements (9A to 9C and 10A to 10C) having different stiffnesses;

the insertion devices (9, 10) each being disposed between the outer bearing shell device (30) and the transverse leaf spring (1), and layer elements (9C and 10C), having a greater stiffness, being positioned between the transverse leaf spring (1) and layer elements (9A and 10A) having a lower stiffness;

the layer elements (9B, 9C and 10B, 10C), having the greater stiffness, are half-shell shaped and convex between end regions (9B1, 9B2, 9C1, 9C2 and 10B1, 10B2, 10C1, 10C2) oriented in an axial direction of the transverse leaf spring (1), and the end regions (9B1, 9B2, 9C1, 9C2 and 10B1, 10B2, 10C1, 10C2) of the layer elements (9B, 9C and 10B, 10C) comprise regions that are curved concavely with respect to a surface (11) of the transverse leaf spring (1) and free ends of the layer elements (9B, 9C and 10B, 10C) point away from the surface (11) of the transverse leaf spring (1); and the layer elements (9C and 10C) having the greater stiffness adjoin the layer elements (9A and 10A) having the lower stiffness and the ends of the transverse leaf spring (1) encompass the layer elements (9A and 10A) having lower stiffness in a form-locking manner in sections.

* * * * *